US011661470B2

(12) United States Patent
Sommazzi et al.

(10) Patent No.: US 11,661,470 B2
(45) Date of Patent: May 30, 2023

(54) BUTADIENE-ISOPRENE DIBLOCK COPOLYMERS AND PROCESS FOR THE PREPARATION THEREOF

(71) Applicant: Versalis S.P.A., San Donato Milanese (IT)

(72) Inventors: Anna Sommazzi, Novara (IT); Giovanni Ricci, Parma (IT); Francesco Masi, Sant'Angelo Lodigiano (IT); Giuseppe Leone, Milan (IT)

(73) Assignee: Versalis S.p.A., San Donato Milanese (IT)

( * ) Notice: Subject to any disclaimer, the term of this patent is extended or adjusted under 35 U.S.C. 154(b) by 573 days.

(21) Appl. No.: 16/617,490

(22) PCT Filed: May 30, 2018

(86) PCT No.: PCT/IB2018/053829
§ 371 (c)(1),
(2) Date: Nov. 26, 2019

(87) PCT Pub. No.: WO2018/220538
PCT Pub. Date: Dec. 6, 2018

(65) Prior Publication Data
US 2020/0109229 A1    Apr. 9, 2020

(30) Foreign Application Priority Data
May 31, 2017  (IT) ...................... 102017000059763

(51) Int. Cl.
C08F 293/00 (2006.01)
C08F 210/14 (2006.01)
C08F 236/06 (2006.01)
C08F 236/08 (2006.01)

(52) U.S. Cl.
CPC ...... *C08F 293/005* (2013.01); *C08F 2420/06* (2013.01); *C08F 2438/00* (2013.01)

(58) Field of Classification Search
CPC .............. C08F 293/005; C08F 2420/06; C08F 2438/00; C08F 210/14; C08F 236/06; C08F 236/08
USPC ......................................................... 526/79
See application file for complete search history.

(56) References Cited

U.S. PATENT DOCUMENTS

| | | | |
|---|---|---|---|
| 5,128,295 A | 7/1992 | Porri et al. | |
| 5,258,475 A | 11/1993 | Kissin | |
| 5,859,133 A * | 1/1999 | Zanzig | B60C 1/0016 525/240 |

FOREIGN PATENT DOCUMENTS

| CN | 1242379 A | 1/2000 |
|---|---|---|
| CN | 0104558451 B | 2/2017 |
| EP | 0796898 A1 | 9/1997 |
| EP | 1266916 A1 | 12/2002 |
| GB | 2346887 A | 8/2000 |
| JP | S59206423 A | 11/1984 |
| RU | 93009807 A | 10/1996 |
| WO | WO 02/102861 A2 | 12/2002 |
| WO | WO 2011/061151 A1 | 5/2011 |
| WO | WO 2014/097087 A1 | 6/2014 |
| WO | WO 2014/097167 A1 | 6/2014 |
| WO | WO 2014/097199 A1 | 6/2014 |
| WO | WO2014/097245 A1 | 6/2014 |
| WO | WO 2015/068094 A1 | 5/2015 |
| WO | WO 2015/068095 A1 | 5/2015 |
| WO | WO2017/081638 A1 | 5/2017 |

OTHER PUBLICATIONS

International Search Report & Written Opinion for PCT/IB2018/053829, dated Aug. 1, 2018, 10 pages.
Liu, et al., "Unprecedented 3,4-Isoprene and cis-1,4-Butadiene Copolymers with Controlled Sequence Distribution by Single Yttrium Cationic Species", Macromolecules, vol. 47, No. 24, 2014, pp. 8524-8530.
Hamley, I. W., "Development in Block Copolymer Science and Technology" (2004), Hamley I. W. Ed., John Wiley & Sons Ltd, New York, Chapter 1, p. 1-29.
Bates, et al., "Macromolecules" (1984), vol. 17(12), p. 2607-2613.
Cohen, et al., "Macromolecules" (1982), vol. 15(2), p. 370-375.
Gehlsen, et al., "Macromolecules" (1992), vol. 25(2), p. 939-943.
Wang, et al., "Journal of Applied Polymer Science" (2003), vol. 88, Issue 4, p. 1049-1054.
Zhang, et al., "Polymer" (2009), vol. 50, p. 5427-5433.
Nath, et al., "Macromolecular Chemistry and Physics" (2002), vol. 203, Issue 4, p. 756-760.
Nath, et al., "Macromolecular Chemistry and Physics" (2003), vol. 204, Issue 16, p. 2017-2022.
Cai, et al., "Macromolecules" (2009), vol. 42(20), p. 7642-7643.
Ricci, et al., "Journal of Molecular Catalysis A: Chemical" (2005), vol. 226, p. 235-241.
Ricci, et al., "Macromolecules" (2005), vol. 38, p. 1064-1070.
Ricci, et al., "Journal of Organometallic Chemistry" (2005), vol. 690, p. 1845-1854.
Ricci, et al., "Advances in Organometallic Chemistry Research" (2007), Yamamoto K. Ed., Nova Science Publisher, Inc., USA, p. 1-36.
Ricci, et al., "Coordination Chemistry Reviews" (2010), vol. 254, p. 661-676.
Ricci, et al., "Cobalt: Characteristics, Compounds, and Applications" (2011), Lucas J. Vidmar Ed., Nova Science Publisher, Inc., USA, p. 39-81.

(Continued)

*Primary Examiner* — Ling Siu Choi
*Assistant Examiner* — Ronald Grinsted
(74) *Attorney, Agent, or Firm* — Praedcere Law

(57) ABSTRACT

Butadiene-isoprene diblock copolymer formed by a block of crystalline polybutadiene (hard block) and by a block of amorphous polyisoprene (soft block). Said butadiene-isoprene diblock copolymer can be advantageously used both in the footwear industry (for example, in the production of shoe soles), and in the production of tires for motor vehicles and/or trucks.

10 Claims, 28 Drawing Sheets

(56) References Cited

OTHER PUBLICATIONS

Lu, et al., "Journal of Applied Polymer Science" (2006), vol. 100, Issue 5, p. 4265-4269.
Gong, et al., "Polymer" (2009), vol. 50, p. 2826-2829.
Gong, et al., "Polymer" (2009), vol. 50, p. 5980-5986.
Nakayama, et al., "Macromolecules" (2003), vol. 36(21), p. 7953-7958.
Ricci, et al., "Journal of Molecular Catalysis A: Chemical" (2003), vol. 204-205, p. 287-293.
Zheng, et al., "Journal of Polymer Science Part A: Polymer Chemistry" (2015), vol. 53, Issue 10, p. 1182-1188.
"Periodic Table of the Elements" refers to the "IUPAC Periodic Table of the Elements", version dated Jun. 22, 2007, available on the following website: www.iupac.org/fileadmin/user_upload/news/IUPAC_Periodic_Table-1Jun12.pdf.
Johnson, et al., in "Journal of the American Chemical Society" (1995), vol. 117, p. 6414-6415.
Van Koten, et al., in "Advances in Organometallic Chemistry" (1982), vol. 21, p. 151-239.
Mochel, V. D., in "Journal of Polymer Science Part A-1: Polymer Chemistry" (1972), vol. 10, Issue 4, p. 1009-1018.
Sato, et al. in "Journal of Polymer Science: Polymer Chemistry Edition" (1979), vol. 17, Issue 11, p. 3551-3558.
Office Action issued by the Russian Patent Office for Russian patent application 2019141089, 8 pages. Translation in English is provided.
Search Report ssued by the Russian Patent Office for Russian patent application 2019141089, dated Aug. 25, 2021, 2 pages. Translation in English is provided.
Office Action issued by Intellectual Property India for Indian patent application 201917048459, dated May 5, 2021, 5 pages. English translation included alongside text of Office action.

\* cited by examiner

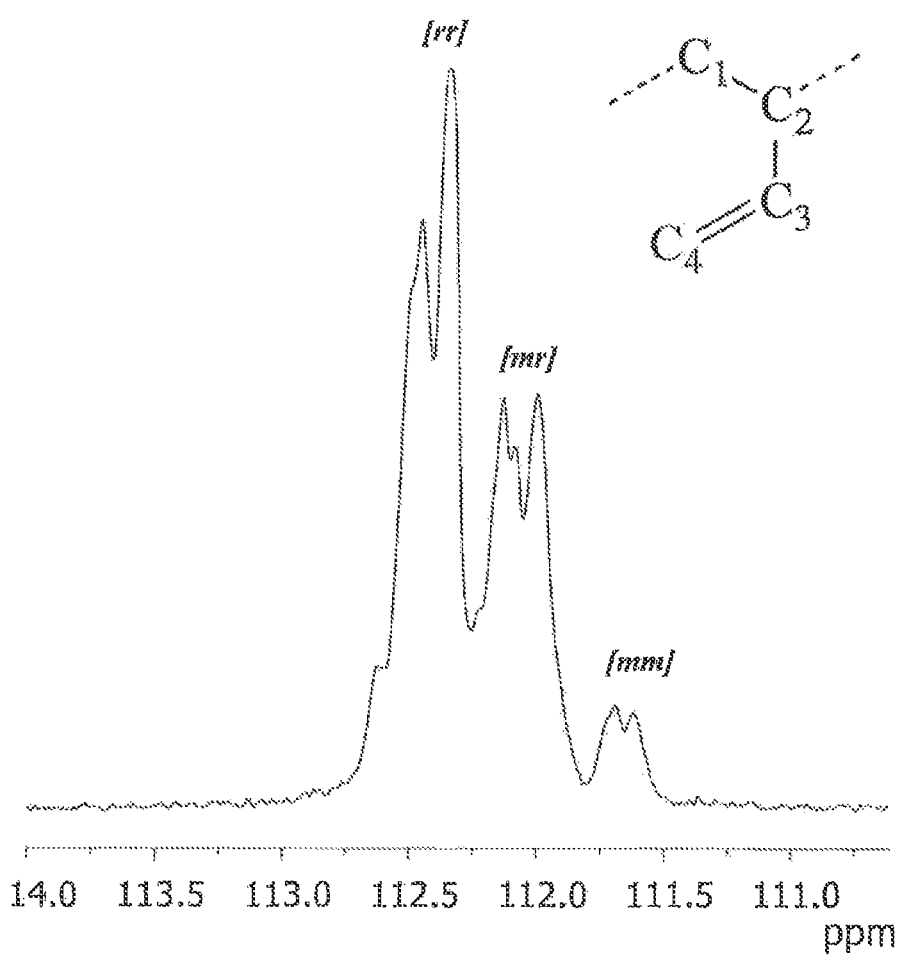
FIGURE 1/A

BUTADIENE-ISOPRENE DIBLOCK COPOLYMERS AND PROCESS FOR THE PREPARATION THEREOF

The present invention relates to a butadiene-isoprene diblock copolymer.

More particularly, the present invention relates to a diblock copolymer formed by a block of crystalline polybutadiene (hard block) and by a block of amorphous polyisoprene (soft block).

The present invention further relates to a process for the preparation of a butadiene-isoprene diblock copolymer formed by a block of crystalline polybutadiene (hard block) and by a block of amorphous polyisoprene (soft block) comprising the following steps: (i) subjecting 1,3-butadiene to living polymerization in the presence of a catalytic system comprising at least one iron complex and continuing said living polymerization until substantially complete 1,3-butadiene conversion; (ii) adding isoprene to the polymerization mixture obtained in step (i) and continuing said living polymerization until substantially complete isoprene conversion.

Said butadiene-isoprene diblock copolymer can be advantageously used both in the footwear industry (for example, in the production of shoe soles), and in the production of tires for motor vehicles and/or trucks.

The design and synthesis of diene block (co)polymers having a controlled microstructure represent a subject of great interest in the field of Polymer Science, precisely because said diene block (co)polymers can combine the properties of one or more homopolymers, providing better performance levels than those obtainable from the simple mixture of the corresponding diene homopolymers as described, for example, in Hamley I. W., "*Development in Block Copolymer Science and Technology*" (2004), Hamley I. W. Ed., John Wiley & Sons Ltd, New York, Chapter 1, pg. 1-29.

A lot of work has therefore been performed in relation to the development of new catalytic systems able to provide diene (co)polymers consisting of stereoblocks having a different structure and/or tacticity such as, for example, (co)polymers consisting of amorpho-crystalline sequences of the same monomer. Said diene (co)polymers often display phase separation and at the same time allow a morphological complex to be obtained thanks to their individual molecular architecture: further details on said diene (co)polymers can be found, for example, in: Bates F. S. et al., "*Macromolecules*" (1984), Vol. 17(12), pg. 2607-2613; Cohen R. E. et al., "*Macromolecules*" (1982), Vol. 15(2), pg. 370-375; Gehlsen M. D. et al., "*Macromolecules*" (1992), Vol. 25(2), pg. 939-943.

Other studies have been performed in the field of stereoblock polymers related to polydienes, in particular polybutadiene. In fact, polybutadiene represents one of the most important polymers whose properties are strongly influenced by its microstructure, which can be of the cis-1,4, trans-1,4 and 1,2 type.

Cis-1,4-polybutadiene is a synthetic elastomer generally having a cis-1,4 content equal to 96%-97%, a melting point ($T_m$) of about $-2°$ C., a crystallization temperature ($T_c$) of about $-25°$ C. and a glass transition temperature ($T_g$) below $-100°$ C., whose properties are very similar to those of natural rubber and whose main use is in the production of tires for motor vehicles and/or trucks. In particular, in the production of tires, polybutadiene with a high cis-1,4 unit content is used.

1,2 polybutadiene may have isotactic or syndiotactic tacticity. Specifically, syndiotactic 1,2 polybutadiene is a crystalline polymer with a melting point of about 200° C., is a typical thermoplastic polymer, which can be used in the production of films, pipes and as a reinforcing agent for rubbers, hence reinforcing the elastic modulus, the tenacity, the abrasion resistance and the durability. However, syndiotactic 1,2 polybutadiene is difficult to process because of its high melting point, which enormously limits its application and use.

1,2/1,4/1,2 tri-block polybutadiene was synthesized through the anionic polymerization of 1,3-butadiene in cyclohexane using 1,1,4,4-tetraphenyl-1,4-dilithium butane (TPB-DiLi) as an initiator as described, for example, in Wang Y. et al., "*Journal of Applied Polymer Science*" (2003), Vol. 88, Issue 4, pg. 1049-1054.

Stereospecific tri-block polybutadienes having high trans-1,4/low cis-1,4/high trans-1,4 (HTPB-b-LCPB-b-HTPBs) were synthesized through the sequential anionic polymerization of 1,3-butadiene using barium salt of di (ethyleneglycol) ethylether/tri-iso-butyl-aluminum/dilithium (BaDE-GEE/TIBA/DLi) as described, for example, in Zhang X. et al., "*Polymer*" (2009), Vol. 50, pg. 5427-5433.

Polybutadiene with a high cis-1,4 content was synthesized through living stereospecific polymerization of 1,3-butadiene in the presence of cobalt dichloride as the catalyst ($CoCl_2$) and methylaluminoxane (MAO) as co-catalyst as described, for example, in Nath D. C. D. et al., "*Macromolecular Chemistry and Physics*" (2002), Vol. 203, Issue 4, pg. 756-760.

The effect of triphenylphosphine ($Ph_3P$) on the living stereospecific polymerization of 1,3-butadiene in the presence of cobalt dichloride as catalyst ($CoCl_2$) and methylaluminoxane (MAO) as co-catalyst has also been studied, demonstrating that the addition of said triphenylphosphine ($Ph_3P$) changes the microtacticity of the polybutadiene obtained from a 99% content of cis-1,4 units to an 88% content of 1,2 units as described, for example, in Nath D. C. D. et al., "*Macromolecular Chemistry and Physics*" (2003), Vol. 204, Issue 16, pg. 2017-2022.

The synthesis of polybutadienes consisting of regioblocks in the presence of cobalt dichloride ($CoCl_2$) as catalyst through the reversible coordination of a Lewis base (for example, a phosphine) is described, for example, in Cai Z. et al., "*Macromolecules*" (2009), Vol. 42(20), pg. 7642-7643.

Further processes related to obtaining polybutadienes with different cis-1,4 unit and 1,2 unit contents in the presence of catalytic cobalt complexes and optionally phosphines, are described, for example, in: Ricci G. et al., "*Journal of Molecular Catalysis A: Chemical*" (2005), Vol. 226, pg. 235-241; Ricci G. et al., "*Macromolecules*" (2005), Vol. 38, pg. 1064-1070; Ricci G. et al., "*Journal of Organometallic Chemistry*" (2005), Vol. 690, pg. 1845-1854; Ricci G. et al., "*Advances in Organometallic Chemistry Research*" (2007), Yamamoto K. Ed., Nova Science Publisher, Inc., USA, pg. 1-36; Ricci G. et al., "*Coordination Chemistry Reviews*" (2010), Vol. 254, pg. 661-676; Ricci G. et al., "*Cobalt: Characteristics, Compounds, and Applications*" (2011), Lucas J. Vidmar Ed., Nova Science Publisher, Inc., USA, pg. 39-81; international patent applications WO 2014/097199, WO 2014/097167, WO 2014/097087, WO2014/097245, in the name of the Applicant.

Processes are also known related to obtaining polybutadienes with different cis-1,4 unit and 1,2 unit contents in the presence of catalytic iron complexes.

For example, polybutadiene with a syndiotactic 1,2 structure was obtained through the polymerization of 1,3-butadiene in the presence of the Fe(2-EHA)$_3$/Al$^i$Bu$_3$/hydrogen phosphite catalytic system (2-EHA=2-ethylhexanoate; Al$^i$Bu$_3$=tri-iso-butyl-aluminum) as described, for example, in Lu J. et al., "*Journal of Applied Polymer Science*" (2006), Vol. 100, Issue 5, pg. 4265-4269.

Polybutadiene with a mixed 1,2, cis-1,4 e trans-1,4 structure was obtained through the polymerization of 1,3-butadiene in the presence of the Fe(2-EHA)$_3$/Al$^i$Bu$_3$/diethyl phosphite (2-EHA=2-ethylhexanoate; Al$^i$Bu$_3$=tri-iso-butyl-aluminum) catalytic system as described, for example, in Gong D. et al, "*Polymer*" (2009), Vol. 50, pg. 2826-2829. Catalytic systems obtained through the combination of iron (III) carboxylates (for example, iron(III) 2-ethylhexanoate [Fe(2-EHA)$_3$]Fe(III) with tri-iso-butyl-aluminum (Al$^i$Bu$_3$) in hexane, in the presence of phosphates (for example, triethylphosphate) are able to polymerize 1,3-butadiene to polybutadiene with a prevalently 1,2 structure and with a high degree of syndiotacticity as described, for example, in Gong D. et al., "*Polymer*" (2009), Vol. 50, pg. 5980-5986.

Catalytic systems comprising iron ter-pyridine complexes [for example, FeCl$_3$(ter-pyridine)], in combination with appropriate alkylating agents, are useful in the stereospecific polymerization of conjugated dienes: said catalytic systems show discrete catalytic activity and are able to provide polybutadienes with a trans-1,4 structure and isoprene with a 1,2/3,4, structure as described, for example, in Nakayama Y. et al., "*Macromolecules*" (2003), Vol. 36(21), pg. 7953-7958. Polybutadienes with a high 1,2 unit content were obtained through the use of catalytic systems containing iron(II) complexes with bidentate aromatic amines (for example, 2,2'-bipyridine (bipy), 1,10-phenanthroline (phen) and aluminum compounds as described, for example, in: Ricci G. et al., "*Journal of Molecular Catalysis A: Chemical*" (2003), Vol. 204-205, pg. 287-293; international patent application WO 02/102861.

Polybutadienes with "soft/hard" stereoblocks, with a mixed cis-1,4/1,2 structure were obtained using the 2-ethylhexanoate of iron/tri-iso-butylaluminum/diethyl phosphate [Fe(2-EHA)$_3$/Al$^i$Bu)$_3$/DEP] catalytic system, appropriately varying the aluminum/iron (Al/Fe) ratio as described, for example, in Zheng W. et al., "*Journal of Polymer Science Part A: Polymer Chemistry*" (2015), Vol. 53, Issue 10, pg. 1182-1188.

Finally, stereoregular diblock polybutadienes formed by a polybutadiene block having a cis-1,4 structure and by a polybutadiene block having a syndiotactic 1,2 structure are described, for example, in international patent application WO 2015/068095, WO 2015/068094, in the name of the Applicant.

Since, as reported above, diene block (co)polymers with a controlled microstructure represent a subject of great interest in the field of Polymer Science, the study of new diene block (co)polymers is still of great interest.

The Applicant has therefore set out to solve the problem of finding a butadiene-isoprene diblock copolymer formed by a block of crystalline polybutadiene (hard block) and by a block of amorphous polyisoprene (soft block).

The Applicant has also found a process for the preparation of a butadiene-isoprene diblock copolymer formed by a block of crystalline polybutadiene (hard block) and by a block of amorphous polyisoprene (soft block) comprising the following stages: (i) subjecting 1,3-butadiene to living polymerization in the presence of a catalytic system comprising at least one iron complex and continuing said living polymerization until substantially complete 1,3-butadiene conversion; (ii) adding isoprene to the polymerization mixture obtained in step (i) and continuing said living polymerization until substantially complete isoprene conversion. The use of the iron complex, thanks to its high catalytic activity and its low level of toxicity, is advantageous both from an economic point of view, and from the point of view of the environment and the health of operators.

Therefore, the subject matter of the present invention is a butadiene-isoprene diblock copolymer formed by a block of crystalline polybutadiene (hard block) and by a block of amorphous polyisoprene (soft block).

For the purpose of the present description and of the following claims, the term "butadiene-isoprene diblock copolymer" means a copolymer containing only two blocks, i.e. the block of crystalline polybutadiene (hard block) and the block of amorphous polyisoprene (soft block), joined together by a single junction point and not interpenetrating.

For the purpose of the present description and of the following claims, the definitions of the numeric ranges always include the extremes unless specified otherwise.

For the purpose of the present description and of the following claims, the term "comprising" also includes the terms "which essentially consists of" or "which consists of".

For the purpose of the present description and of the following claims the expression "room temperature" means a temperature ranging from 20° C. to 25° C.

In accordance with a preferred embodiment of the present invention, said butadiene-isoprene diblock copolymer is formed by: a block of crystalline polybutadiene (hard block) having a syndiotactic 1,2 units content ≥60%, preferably ranging from 64% to 80%, and a block of amorphous polyisoprene (soft block) having a 3,4 atactic units content ≥60%, preferably ranging from 65% to 75%.

In accordance with a preferred embodiment of the present invention, said butadiene-isoprene diblock copolymer has the following characteristics:
  upon infra-red analysis (FT-IR) typical bands of cis-1,4 and 1,2 syndiotactic butadiene units centered at 737 cm$^{-1}$ and 911 cm$^{-1}$, respectively, and of isoprene cis-1,4 and 3,4 atactic units centered at 840 cm$^{-1}$ and 890 cm$^{-1}$, respectively.

The infra-red analysis (FT-IR) was performed as stated below in the paragraph "*Analysis and characterization methods*".

In accordance with a further preferred embodiment of the present invention, in said butadiene-isoprene diblock copolymer:
  the block of crystalline polybutadiene (hard block) can have a melting point ($T_m$) greater than or equal to 65° C., preferably ranging from 70° C. to 130° C., and a crystallization temperature ($T_c$) greater than or equal to 50° C., preferably ranging from 55° C. to 110° C.;
  the block of amorphous polyisoprene (soft block) can have a glass transition temperature ($T_g$) lower than or equal to −35° C., preferably ranging from −40° C. to −60° C.

Said glass transition temperature ($T_g$), said melting point ($T_m$) and said crystallization temperature ($T_c$), were determined through DSC—Differential Scanning calorimetry—analysis, which was performed as stated below in the paragraph "*Analysis and characterization methods*".

In accordance with a further preferred embodiment of the present invention, said butadiene-isoprene diblock copolymer can have a polydispersion index (PDI) corresponding to the ratio $M_w/M_n$ ($M_w$=weight average molecular weight; $M_n$=number average molecular weight) ranging from 2.0 to 2.6.

Said polydispersion index (PDI) was determined by GPC (Gel Permeation Chromatography) which was performed as stated below in the paragraph "*Analysis and characterization methods*".

It is to be noted that, in the present patent application, the presence of a narrow monomodal peak, i.e. of a polydispersion index (PDI) ranging from 2.0 to 2.6, indicates the presence of a homogeneous polymeric species excluding, at the same time, the presence of two different homopolymers (i.e. of a homopolymer with a crystalline structure and of a homopolymer with an amorphous structure).

It is also to be noted that the isolated fractions (i.e. extract soluble in ether and residue insoluble in ether) obtained by subjecting the butadiene-isoprene diblock copolymer object of the present invention to continuous extraction with boiling diethylether, for 4 hours, always have a composition/structure that is exactly like that of the starting polymer.

The butadiene-isoprene diblock copolymer object of the present invention, subjected to AFM—Atomic Force Microscopy—presents two clearly distinctive domains relative to the block of crystalline polybutadiene (hard block) and to the block of amorphous polyisoprene (soft block) and, in particular, a homogeneous distribution of said domains as highlighted in FIGS. 13 and 23 reported below.

Said AFM—Atomic Force Microscopy—was performed as reported below in the paragraph "*Analysis and characterization methods*".

In the butadiene-isoprene diblock copolymer object to the present invention, the crystalline polybutadiene block can have a different degree of crystallinity depending on the syndiotactic triad [(rr) %] content: in particular, the degree of crystallinity increases as the syndiotactic triad [(rr) %] content increases. Preferably, said syndiotactic triad [(rr) %] content may be greater than or equal to 60%, preferably ranging from 65% to 80%.

The syndiotactic triad [(rr) %] content was determined through $^{13}$C-NMR spectroscopy, which was performed as stated in the paragraph "*Analysis and characterization methods*".

In accordance with a preferred embodiment of the present invention, said butadiene-isoprene diblock copolymer may have an average molecular weight ($M_w$) ranging from 600000 g/mol to 1300000 g/mol, preferably ranging from 650000 g/mol to 1250000 g/mol.

As mentioned above, the present invention further relates to a process for the preparation of a butadiene-isoprene diblock copolymer formed by a block of crystalline polybutadiene (hard block) and by a block of an amorphous polyisoprene (soft block). Therefore, a further subject matter of the present invention is a process for the preparation of a butadiene-isoprene diblock copolymer formed by a block of crystalline polybutadiene (hard block) and by a block of an amorphous polyisoprene (soft block) comprising the following steps:

(i) subjecting 1,3-butadiene to living polymerization in the presence of a catalytic system comprising at least one iron complex having general formula (I) or (II):

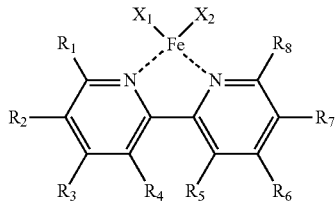

(I)

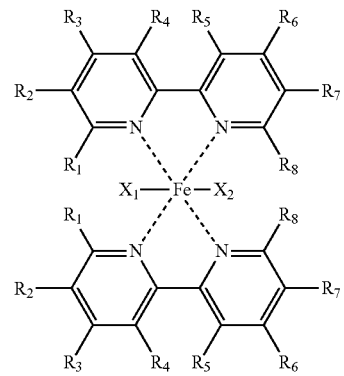

(II)

wherein:
$R_1$, $R_2$, $R_3$, $R_4$, $R_5$, $R_6$, $R_7$ and $R_8$, identical or different, represent a hydrogen atom; or they are selected from linear or branched, optionally halogenated, $C_1$-$C_{20}$ alkyl groups, preferably $C_1$-$C_{15}$, optionally substituted cycloalkyl groups;
or $R_4$ and $R_5$, may be optionally linked together to form, together with the other atoms to which they are linked, a saturated, unsaturated or aromatic cycle containing from 4 to 6 carbon atoms, optionally substituted with linear or branched, $C_1$-$C_{20}$ alkyl groups, preferably $C_1$-$C_{15}$, said cycle optionally containing heteroatoms such as, for example, oxygen, sulfur, nitrogen, silicon, phosphorous, selenium;
or $R_1$ and $R_2$ or $R_3$ and $R_2$, and/or $R_3$ and $R_4$, and/or $R_5$ and $R_6$, and/or $R_6$ and $R_7$ o $R_7$ and $R_8$, may be optionally linked together to form together with other atoms to which they are linked, a saturated, unsaturated or aromatic cycle containing from 4 to 6 carbon atoms, optionally substituted with linear or branched, $C_1$-$C_{20}$ alkyl groups, preferably $C_1$-$C_{15}$, said cycle optionally containing heteroatoms such as, for example, oxygen, sulfur, nitrogen, silicon, phosphorus, selenium;
$X_1$ and $X_2$, identical or different, represent a halogen atom such as, for example, chlorine, bromine, iodine; or are selected from linear or branched $C_1$-$C_{20}$ alkyl groups, preferably $C_1$-$C_{15}$, —OCOR$_9$ groups or —OR$_9$ groups wherein R$_9$ is selected from linear or branched $C_1$-$C_{20}$ alkyl groups, preferably $C_1$-$C_{15}$;
and continuing said living polymerization until substantially complete conversion of 1,3-butadiene;
(ii) adding isoprene to the polymerization mixture obtained in step (i) and continuing said living polymerization until substantially complete isoprene conversion. For the purpose of the present description and of the following claims, the phrase "substantially complete conversion" means that the polymerization is continued until at least 98%, preferably at least 99%, more preferably 100%, of the monomer loaded, i.e. 1,3-butadiene in step (i) and isoprene in step (ii), has been polymerized.

In accordance with a preferred embodiment of the present invention, in said iron complex having general formula (I) or (II):
$R_1$, $R_2$, $R_3$, $R_4$, $R_5$, $R_6$, $R_7$ and $R_8$, identical, represent a hydrogen atom;
or $R_1$, $R_2$, $R_3$, $R_6$, $R_7$ and $R_8$, identical, represent a hydrogen atom and $R_4$ and $R_5$ are linked to form together with the other atoms to which they are linked a saturated, unsaturated, or aromatic cycle containing from 4 to 6 carbon atoms, preferably benzene;

$X_1$ and $X_2$, identical or different, represent a halogen atom such as, for example, chlorine, bromine, iodine, preferably chlorine.

Further details related to said iron complexes having general formula (I) or (II) as well as to the preparation thereof, can be found in international patent application WO 02/102861, the contents of which are incorporated herein as reference.

The aforementioned iron complex having general formula (I) or (II) can be considered, in accordance with the present invention, under any physical form such as, for example, the isolated and purified solid form, the form solvated with an appropriate solvent, or the one supported on suitable organic or inorganic solids, preferably having a granular or powdered physical form.

In accordance with a preferred embodiment of the present invention, said catalytic system may comprise (b) at least one co-catalyst selected from:

($b_1$) aluminum alkyls having general formula (III):

$$Al(X')_n(R_{10})_{3-n} \quad (III)$$

wherein X' represents a halogen atom such as, for example, chlorine, bromine, iodine, fluorine; $R_{10}$, identical or different, represent a hydrogen atom, or are selected from linear or branched $C_1$-$C_{20}$ alkyl groups, cycloalkyl groups, aryl groups, said groups being optionally substituted with one or more silicon or germanium atoms; and n is an integer ranging from 0 to 2;

($b_2$) organooxygenated compounds of an element M' other than carbon belonging to groups 13 or 14 of the Periodic Table of the Elements, preferably organooxygenated compounds of aluminum, gallium, tin.

Said organo-oxygenated compounds ($b_2$) can be defined as organic compounds of M', wherein the latter is linked to at least one oxygen atom and to at least one organic group comprising an alkyl group having from 1 to 6 carbon atoms, preferably methyl.

It is to be noted that for the purpose of the present invention and of the following claims, the term "Periodic Table of the Elements" refers to the "IUPAC Periodic Table of the Elements", version dated 22 Jun. 2007, available on the following website: www.iupac.org/fileadmin/user upload/news/IUPAC_Periodic_Table-1Jun12.pdf.

Specific examples of aluminum alkyls having general formula (III) particularly useful for the purpose of the present invention are: tri-methyl-aluminum, tri-(2,3,3-tri-methyl-butyl)-aluminum, tri-(2,3-di-methyl-hexyl)-aluminum, tri-(2,3-di-methyl-butyl)-aluminum, tri-(2,3-di-methyl-pentyl)-aluminum, tri-(2,3-di-methyl-heptyl)-aluminum, tri-(2-methyl-3-ethyl-pentyl)-aluminum, tri-(2-methyl-3-ethyl-hexyl)-aluminum, tri-(2-methyl-3-ethyl-heptyl)-aluminum, tri-(2-methyl-3-propyl-hexyl)-aluminum, tri-ethyl-aluminum, tri-(2-ethyl-3-methyl-butyl)-aluminum, tri-(2-ethyl-3-methyl-pentyl)-aluminum, tri-(2,3-di-ethyl-pentyl-aluminum), tri-n-propyl-aluminum, tri-iso-propyl-aluminum, tri-(2-propyl-3-methyl-butyl)-aluminum, tri-(2-iso-propyl-3-methyl-butyl)-aluminum, tri-n-butyl-aluminum, tri-iso-butyl-aluminum (TIBA), tri-tert-butyl-aluminum, tri-(2-iso-butyl-3-methyl-pentyl)-aluminum, tri-(2,3,3-tri-methyl-pentyl)-aluminum, tri-(2,3,3-tri-methyl-hexyl)-aluminum, tri-(2-ethyl-3,3-di-methyl-butyl)-aluminum, tri-(2-ethyl-3,3-di-methyl-pentyl)-aluminum, tri-(2-iso-propyl-3,3-dimethyl-butyl)-aluminum, tri-(2-tri-methylsilyl-propyl)-aluminum, tri-2-methyl-3-phenyl-butyl)-aluminum, tri-(2-ethyl-3-phenyl-butyl)-aluminum, tri-(2,3-di-methyl-3-phenyl-butyl)-aluminum, tri-(2-phenyl-propyl)-aluminum, tri-[2-(4-fluoro-phenyl)-propyl]-aluminum, tri-[2-(4-chloro-phenyl)-propyl]-aluminum, tri-[2-(3-iso-propyl-phenyl-tri-(2-phenyl-butyl)-aluminum, tri-(3-methyl-2-phenyl-butyl)-aluminum, tri-(2-phenyl-pentyl)-aluminum, tri-[2-(penta-fluoro-phenyl)-propyl]-aluminum, tri-(2,2-di-phenyl-ethyl]-aluminum, tri-(2-phenyl-methyl-propyl]-aluminum, tri-pentyl-aluminum, tri-hexyl-aluminum, tri-cyclo-hexyl-aluminum, tri-octyl-aluminum, di-ethyl-aluminum hydride, di-n-propyl-aluminum hydride, di-n-butyl-aluminum hydride, di-iso-butyl-aluminum hydride (DIBAH), di-hexyl-aluminum hydride, di-iso-hexyl-aluminum hydride, di-octyl-aluminum hydride, di-iso-octyl-aluminum hydride, ethyl-aluminum di-hydride, n-propyl-aluminum di-hydride, iso-butyl-aluminum di-hydride, di-ethyl-aluminum chloride (DEAC), mono-ethyl-aluminum dichloride (EADC), di-methyl-aluminum chloride, di-iso-butyl-aluminum chloride, iso-butyl-aluminum dichloride, ethyl-aluminum-sesquichloride (EASC), as well as the corresponding compounds wherein one of the hydrocarbon substituents is substituted by a hydrogen atom and those wherein one or two of the hydrocarbon substituents are substituted with an iso-butyl group. Di-iso-butyl-aluminum hydride (DIBAH), tri-iso-butyl-aluminum (TIBA), di-ethyl-aluminum chloride (DEAC), mono-ethyl-aluminum dichloride (EADC), ethyl-aluminum-sesquichloride (EASC), are particularly preferred.

Preferably, when used for the formation of a catalytic copolymerization system in accordance with the present invention, the aluminum alkyls having general formula (III) can be placed in contact with an iron complex having general formula (I) or (II), in proportions such that the molar ratio between the iron contained in the iron complex having general formula (I) or (II) and the aluminum contained in the aluminum alkyls having general formula (III) can be ranging from 5 to 5000, preferably ranging from 10 to 1000. The sequence with which the iron complex having general formula (I) or (II) and the aluminum alkyl having general formula (III) are placed in contact with each other is not particularly critical.

Further details on aluminum alkyls having general formula (III) can be found in international patent application WO 2011/061151.

In accordance with a particularly preferred embodiment, said organo-oxygenated compounds ($b_2$) can be chosen from the aluminoxanes having general formula (IV):

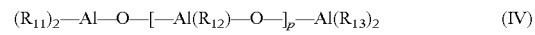

$$(R_{11})_2—Al—O—[—Al(R_{12})—O—]_p—Al(R_{13})_2 \quad (IV)$$

wherein $R_{11}$, $R_{12}$ and $R_{13}$, identical or different, represent a hydrogen atom, or a halogen atom such as, for example, chlorine, bromine, iodine, fluorine; or are selected from linear or branched $C_1$-$C_{20}$ alkyl groups, cycloalkyl groups, aryl groups, said groups being optionally substituted with one or more silicon or germanium atoms; and p is an integer ranging from 0 to 1000.

As is known, aluminoxanes are compounds containing Al—O—Al bonds, with a variable O/Al ratio, obtainable according to processes known in the prior art such as, for example, by reaction, in controlled conditions, of an aluminum alkyl or an aluminum alkyl halogenide, with water, or with other compounds containing predetermined quantities of available water such as, for example, in the case of the reaction of aluminum trimethyl with aluminum sulfate hexahydrate, copper sulfate pentahydrate, or iron sulfate pentahydrate.

Said aluminoxanes and, in particular, methylaluminoxane (MAO), are compounds that can be obtained through known organometallic chemical processes as, for example, by adding trimethyl aluminum to a suspension in aluminum sulfate hexahydrate. Preferably, when used for the formation of a catalytic copolymerization system in accordance with the present invention, the aluminoxanes having general formula (IV) can be placed in contact with an iron complex having general formula (I) or (II), in proportions such that the molar ratio between the aluminum (Al) contained in the aluminoxane having general formula (IV) and the iron contained in the iron complex having general formula (I) or (II) is ranging from 10 to 10000, preferably ranging from 100 to 5000. The sequence with which the iron complex having general formula (I) or (II) and the aluminoxane having general formula (IV) are placed in contact with each other is not particularly critical.

As well as the aforementioned preferred aluminoxanes having general formula (IV), the definition of the compound ($b_2$) in accordance with the present invention also includes galloxanes wherein, in the general formula (IV), gallium is present in the place of aluminum and stannoxanes wherein, in the general formula (IV), tin is present in the place of aluminum, whose use as co-catalysts for the polymerization of olefins in the presence of metallocene complexes is known. Further details in relation to said galloxanes and stannoxanes can be found, for example, in the American patents U.S. Pat. Nos. 5,128,295 and 5,258,475.

Specific examples of aluminoxanes having general formula (IV) particularly useful for the purpose of the present invention are: methylaluminoxane (MAO), ethyl-aluminoxane, n-butyl-aluminoxane, tetra-iso-butyl-aluminoxane (TIBAO), tert-butyl-aluminoxane, tetra-(2,4,4-tri-methyl-pentyl)-aluminoxane (TIOAO), tetra-(2,3-di-methyl-butyl)-aluminoxane (TDMBAO), tetra-(2,3,3-tri-methyl-butyl)-aluminoxane (TTMBAO). Methylaluminoxane (MAO) is particularly preferred.

Further details on aluminoxanes having general formula (IV) can be found in international patent application WO 2011/061151.

In general, the formation of the catalytic system comprising the iron complex having general formula (I) or (II) and the co-catalyst (b), is preferably performed in an inert liquid medium, more preferably in a hydrocarbon solvent. The choice of the iron complex having general formula (I) or (II) and the co-catalyst (b), as well as the particular methodology used, may vary depending on the molecular structures and the desired result, according to what is similarly reported in relevant literature accessible to an expert skilled in the art for other transition metal complexes with imine ligands, as reported, for example, by L. K. Johnson et al., in "*Journal of the American Chemical Society*" (1995), Vol. 117, pag. 6414-6415, and by van Koten G. et al, in "*Advances in Organometallic Chemistry*" (1982), Vol. 21, pag. 151-239.

For the purpose of the present description and of the following claims, the terms "mole" and "molar ratio" are used both with reference to compounds consisting of molecules and with reference to atoms and ions, omitting for the latter ones the terms gram atom or atomic ratio, even if they are scientifically more accurate.

For the purpose of the present invention, other additives or components may optionally be added to the aforementioned catalytic system so as to adapt it to satisfy specific practical requirements. The catalytic systems thus obtained can therefore be considered included within the scope of the present invention. Additives and/or components that can be added in the preparation and/or formulation of the catalytic system according to the present invention are, for example: inert solvents, such as, for example, aliphatic and/or aromatic hydrocarbons; aliphatic and/or aromatic ethers; weakly coordinating additives (e.g., Lewis bases) selected, for example, from non-polymerizable olefins; sterically hindered or electronically poor ethers; halogenating agents such as, for example, silicon halides, halogenated hydrocarbons, preferably chlorinated; or mixtures thereof.

Said catalytic system can be prepared, as already reported above, according to methods known in the prior art.

For example, said catalytic system can be prepared separately (preformed) and subsequently introduced into the (co)polymerization environment. On this point, said catalytic system can be prepared by making at least one iron complex having general formula (I) or (II) react with at least one co-catalyst (b), optionally in presence of other additives or components selected from those cited above, in presence of a solvent such as, for example, toluene, heptane, at a temperature ranging from 20° C. to 60° C., for a time ranging from 10 seconds to 10 hours, preferably ranging from 30 seconds to 5 hours. Further details on the preparation of said catalytic system can be found in the examples reported below.

Alternatively, said catalytic system can be prepared in situ, i.e. directly in the (co)polymerization environment. On this point, said catalytic system can be prepared by separately introducing the iron complex having general formula (I) or (II), the co-catalyst (b) and 1,3-butadiene, operating under the conditions wherein the polymerization is performed in step (i) of the process according to the present invention.

For the purpose of the present invention, the aforementioned catalytic systems can also be supported on inert solids, preferably consisting of silicon and/or aluminum oxides, such as, for example, silica, alumina or silico-aluminates. For supporting said catalytic systems the known supporting techniques can be used, generally comprising contact, in a suitable inert liquid medium, between the support, optionally activated by heating to temperatures over 200° C., and one or both components, i.e. the iron complex having general formula (I) or (II) and (b) the co-catalyst, of the catalytic system used in the present invention. It is not necessary, for the purposes of the present invention, for both components to be supported, since only the iron complex (a) having general formula (I) or (II), or the co-catalyst (b) may be present on the support surface. In the latter case, the missing component on the surface is subsequently placed in contact with the supported component when the active catalyst is to be formed by polymerization.

The scope of the present invention also includes the iron complex having general formula (I) or (II), and catalytic systems based thereon, which are supported on a solid through the functionalization of the latter and the formation of a covalent bond between the solid and the iron complex having general formula (I) or (II).

The quantity of iron complex having general formula (I) or (II) and co-catalyst (b) which can be used in the (co) polymerization of conjugated dienes varies according to the (co)polymerization process to be performed. Said quantity is however such as to obtain a molar ratio between the iron contained in the iron complex having general formula (I) or (II) and the metal contained in the co-catalyst (b), e.g., aluminum in the case wherein the co-catalyst (b) is chosen from the aluminum alkyls ($b_1$) or from the aluminoxanes ($b_2$), boron in the case wherein the co-catalyst (b) is chosen from the compounds or mixtures of compounds ($b_3$) having general formula (IV), ranging from the values reported above.

In accordance with a preferred embodiment of the present invention, said process can be performed in the presence of an inert organic solvent, chosen, for example, from: saturated aliphatic hydrocarbons such as, for example, butane, pentane, hexane, heptane, or mixtures thereof; saturated cyclo-aliphatic hydrocarbons such as, for example, cyclopentane, cyclohexane, or mixtures thereof; mono-olefins such as, for example, 1-butene, 2-butene, or mixtures thereof; aromatic hydrocarbons such as, for example, benzene, toluene, xylene, or mixtures thereof; halogenated hydrocarbons such as, for example, methylene chloride, chloroform, carbon tetrachloride, trichloroethylene, perchloroethylene, 1,2-dichloroethane, chlorobenzene, bromobenzene, chlorotoluene, or mixtures thereof. Preferably, said solvent is chosen from saturated aliphatic hydrocarbons, more preferably toluene.

In accordance with a preferred embodiment of the present invention, in said process:
  in step (i), the concentration of 1,3-butadiene in said inert organic solvent can be ranging from 5% by weight to 50% by weight, preferably ranging from 10% by weight to 20% by weight, relative to the total weight of the 1,3-butadiene mixture and the inert organic solvent;
  in step (ii), the isoprene concentration can be ranging from 5% by weight to 50% by weight, preferably ranging from 10% by weight to 20% by weight, relative to the total weight of the polymerization mixture obtained in said step (i).

In accordance with a preferred embodiment of the present invention, said process can be performed at a temperature ranging from −70° C. to +100° C., preferably ranging from −20° C. to +80° C.

With regard to pressure, it is preferable to operate at the pressure of the component(s) of the mixture to be copolymerized.

The aforementioned process can be performed both continuously and in batches.

BRIEF DESCRIPTION OF THE DRAWINGS:

FIG. 1A shows an example of the $^{13}$C-NMR spectrum of a butadiene-isoprene diblock copolymer object of the present invention (specifically showing only the olefinic zone relative to the C4 carbon of a 1,2 structure butadiene unit).

Figure 1:
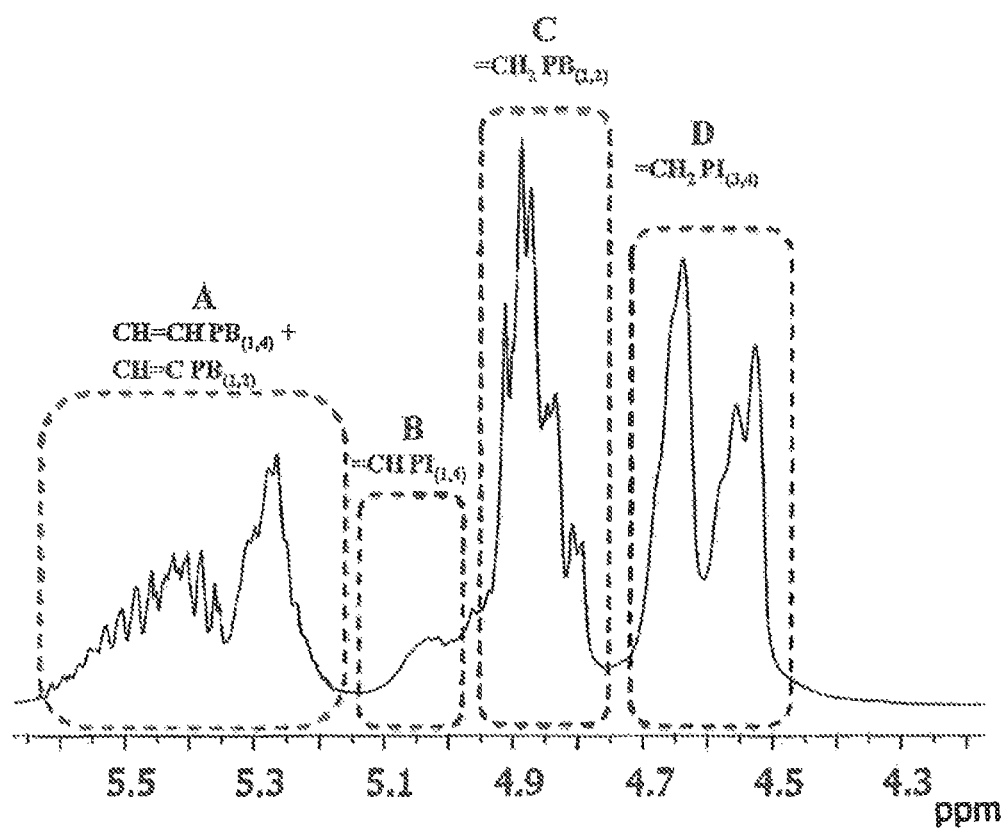
FIG. 1 shows an example of the $^1$H-NMR spectrum of a butadiene-isoprene diblock copolymer object of the present invention.

For the purpose of understanding the present invention better and to put it into practice, below are some illustrative and non-limiting examples thereof.

EXAMPLES

Reagents and Materials

The list below reports the reagents and materials used in the following examples of the invention, any pre-treatments thereof and their manufacturer:
  anhydrous iron(II) chloride ($FeCl_2$) (Aldrich): purity 97%, used as such;
  iron(II) chloride tetrahydrate ($FeCl_2.4H_2O$) (Aldrich): purity 99.99%, used as such;
  2,2'-bipyridine (Aldrich): purity a ≥98%, used as such;
  1,10-phenanthroline (Aldrich): purity ≥99%, used as such;
  phosphoric anhydride ($P_2O_5$) (Aldrich): purity ≥99%, used as such;
  methylaluminoxane (MAO) (toluene solution 10% in weight) (Aldrich): used as such;
  tri-iso-butyl-aluminum (TIBA) (Aldrich): purity ≥99%, used as such;
  pentane (Fluke): purity 99%, refluxed over a sodium/potassium (Na/K) alloy in a nitrogen atmosphere for about 8 hours and subsequently distilled and maintained in said atmosphere, at 4° C., on molecular sieves;

heptane (Fluka): purity 99%, refluxed over a sodium/potassium (Na/K) alloy in a nitrogen atmosphere for about 8 hours and subsequently distilled and maintained in said atmosphere, at 4° C., on molecular sieves;

toluene (Fluke); purity ≥99.5%, refluxed over sodium (Na) in a nitrogen atmosphere for about 8 hours and subsequently distilled and maintained in said atmosphere, at 4° C., on molecular sieves;

diethylether (Aldrich): purity ≥99.8%, refluxed over a sodium/potassium (Na/K) alloy in a nitrogen atmosphere for about 8 hours and subsequently distilled and maintained in said atmosphere, at 4° C., on molecular sieves;

1,2-dichlorobenzene (Aldrich): purity ≥99%, refluxed over calcium hydride ($CaH_2$) in a nitrogen atmosphere for about 8 hours and subsequently distilled and maintained in said atmosphere, at 4° C., on molecular sieves;

1,3-butadiene (Air Liquide): purity ≥99.5%, evaporated from the container before each production, dried by passing it through a molecular sieve packed column and condensed inside the reactor that was pre-cooled to −20° C.;

isoprene (Aldrich): purity ≥99%, refluxed over calcium hydride ($CaH_2$) for 2 hours, then distilled "trap-to-trap" and stored in a nitrogen atmosphere at 4° C.;

ethanol (Carlo Erba, RPE): anhydrified through distillation on magnesium (Mg) and subsequently degassed;

methanol (Carlo Erba, RPE): used as such;

hydrochloric acid in 37% aqueous solution (Aldrich): used as such;

dichloromethane ($CH_2Cl_2$) (Acros): pure, ≥99.9%, used as such;

hydrofluoric acid (HF) (40% aqueous solution) (Aldrich): used as such;

sulfuric acid ($H_2SO_4$) (96% aqueous solution) (Aldrich): used as such;

nitric acid ($HNO_3$) (70% aqueous solution) (Aldrich): used as such;

sodium carbonate ($Na_2CO_3$) (Aldrich): used as such;

silver nitrate ($AgNO_3$) (Aldrich): used as such;

deuterated tetrachloroethylene ($C_2D_2Cl_4$) (Acros): used as such;

hexamethyldisilazane (HMDS) (Acros): used as such;

deuterated chloroform ($CDCl_3$) (Aldrich): used as such;

tetramethylsilane (TMS) (Acros): used as such;

chloroform ($CH_2Cl_3$) (Aldrich): used as such.

Analysis and Characterization Methods

The analysis and characterization methods reported below were used.

Elementary Analysis a) Determination of Fe

For the determination of the quantity by weight of iron (Fe) in the iron complexes used in the present invention, an exactly weighed aliquot, operating in dry-box under nitrogen flow, of about 30 mg-50 mg of sample, was placed in a 30 ml platinum crucible, together with a 1 ml mixture of 40% hydrofluoric acid (HF), 0.25 ml of 96% sulfuric acid ($H_2SO_4$) and 1 ml of 70% nitric acid ($HNO_3$). The crucible was then heated on a hot plate increasing the temperature until white sulfur fumes appeared (about 200° C.). The mixture thus obtained was cooled to ambient temperature and 1 ml of 70% nitric acid ($HNO_3$) was added, then it was left again until fumes appeared. After repeating the sequence another two times, a clear, almost colorless, solution was obtained. 1 ml of nitric acid ($HNO_3$) and about 15 ml of water were then added cold, then heated to 80° C. for about 30 minutes. The sample thus prepared was diluted with MilliQ pure water until it weighed about 50 g, precisely weighed, to obtain a solution on which the instrumental analytical determination was performed using a Thermo Optek IRIS Advantage Duo ICP-OES (plasma optical emission) spectrometer, for comparison with solutions of known concentration. For this purpose, for every analyte, a calibration curve was prepared in the range 0 ppm-10 ppm, measuring calibration solutions by dilution by weight of certified solutions.

The solution of sample prepared as above was then diluted again by weight in order to obtain concentrations close to the reference ones, before performing spectrophotometric measurement. All the samples were prepared in double quantities. The results were considered acceptable if the individual repeated test data did not have a relative deviation of more than 2% relative to their mean value.

b) Determination of Chlorine

For said purpose, samples of the iron complexes used in the present invention, about 30 mg-50 mg, were precisely weighed in 100 ml glass beakers in dry-box under nitrogen flow. 2 g of sodium carbonate ($Na_2CO_3$) were added and, outside the dry-box, 50 ml of MilliQ water. It was brought to the boil on the hot plate, under magnetic stirring, for about 30 minutes. It was left to cool, then 1/5 diluted sulfuric acid ($H_2SO_4$) was added, until acid reaction and was then titrated with 0.1 N silver nitrate ($AgNO_3$) with a potentiometric titrator.

c) Determination of Carbon, Hydrogen and Nitrogen

The determination of carbon, hydrogen and nitrogen, in the iron complexes used in the present invention, as well as in the ligands used for the purpose of the present invention, was performed through a Carlo Erba automatic analyzer Mod. 1106.

$^{13}$C-NMR and $^1$H-NMR Spectra

The $^{13}$C-NMR and $^1$H-NMR spectra were recorded using a nuclear magnetic resonance spectrometer mod. Bruker Avance 400, using deuterated tetrachloroethylene ($C_2D_2Cl_4$) at 103° C., and hexamethyldisilazane (HDMS) as internal standard, or using deuterated chloroform ($CDCl_3$), at 25° C., and tetramethylsilane (TMS) as internal standard. For this purpose, copolymeric solutions were used with concentrations equal to 10% by weight relative to the total weight of the copolymeric solution.

The microstructure of the butadiene-isoprene diblock copolymers according to the present invention [i.e. cis-1,4 (%) and 1,2 syndiotactic (%) unit content for polybutadiene and cis-1,4(%), 3,4 atactic (%) unit content for polyisoprene] was determined through the analysis of the aforementioned spectra based on the contents reported in literature by Mochel, V. D., in "*Journal of Polymer Science Part A-1: Polymer Chemistry*" (1972), Vol. 10, Issue 4, pg. 1009-1018 for polybutadiene, and by Sato H. et al. in "*Journal of Polymer Science: Polymer Chemistry Edition*" (1979), Vol. 17, Issue 11, pg. 3551-3558, for polyisoprene. For that purpose:

FIG. 1 shows, by way of example, the $^1$H-NMR spectrum of a butadiene-isoprene diblock copolymer object of the present invention from which, as reported below, it is possible to determine the composition and the microstructure of said copolymer;

FIG. 1/A, shows, by way of example, the $^{13}$C-NMR spectrum of a butadiene-isoprene diblock copolymer object of the present invention (specifically showing only the olefinic zone relative to the C4 carbon of a 1,2 structure butadiene unit) from which, as reported below, it is possible to determine the percentage of syndiotactic triad [(rr) %] in the block of polybutadiene having a 1,2 structure of said copolymer.

In particular, in FIG. 1:

A=area of the peaks ranging from 5.15 ppm to 5.65 ppm, corresponding to the two olefinic protons of a butadiene unit having a cis-1,4 structure and to one of the three olefinic protons of a butadiene unit having a 1,2 structure;

B=area of the peak ranging from 5.0 ppm to 5.15 ppm, relative to the olefinic proton of a cis-1,4 isoprene unit;

C=area of the peaks ranging from 4.75 ppm to 5.0 ppm, corresponding to two of the three olefinic protons of a butadiene unit having a 1,2 structure;

D=area of the peaks ranging from 4.45 ppm to 4.75 ppm, corresponding to two of the three olefinic protons of a butadiene unit having a 3,4 structure.

The composition and the microstructure of the butadiene-isoprene diblock copolymers object of the present invention is therefore obtained from the following equations:

total % content of isoprene units (cis-1,4+3,4): $\{(D+2B)/[(D+2B)+(A+C/2)]\} \times 100$;

total % content of butadiene units (cis-1,4+1,2): $\{(A+C/2)/[(D+2B)+(A+C/2)]\} \times 100$;

percentage of 1,2 units in the butadiene block: $[C/(A+C/2)] \times 100$;

percentage of 3,4 units in the isoprene block: $[D/(D+2B)] \times 100$.

In particular, in FIG. 1/A, the $^{13}$C-NMR spectrum shown therein (as specified above, only the olefinic zone relative to the C4 carbon of a 1,2 structure butadiene unit is shown), the percentage of syndiotactic triads [(rr) %] in the block of polybutadiene having 1,2 structure has been obtained from the areas of the peaks related to the C4 olefinic carbon of a 1,2 unit, through the following equations:

content of syndiotactic triads [(rr) %]: $[(rr)\%] = \{[rr]/[rr+mr+mm]\} \times 100$ wherein:

[rr]: area of the peaks related to the syndiotactic triad;
[mr]: area of the peaks related to the atactic triad;
[mm]: area of the peaks related to the isotactic triad.

I.R. Spectra

The I.R. spectra (FT-IR) were recorded through Thermo Nicolet Nexus 670 and Bruker IFS 48 spectrophotometers.

The I.R. spectra (FT-IR) of the of the butadiene-isoprene diblock copolymers object of the present invention, were obtained from polymeric films on potassium bromide (KBr) tablets, said films being obtained through the deposition of a solution in hot 1,2-dichlorobenzene of the butadiene-isoprene diblock copolymer to be analyzed. The concentration of the copolymeric solutions analyzed was equal to 10% by weight relative to the total weight of the copolymeric solution.

Thermal Analysis (DSC)

The DSC—Differential Scanning calorimetry—thermal analysis, for the purpose of determining the melting point ($T_m$) and the crystallization temperature ($T_c$) of the butadiene-isoprene diblock copolymers object of the present invention, was performed using a Perkin Elmer Pyris differential scanning calorimeter. For this purpose, 5 mg of the butadiene-isoprene diblock copolymer obtained were analyzed, with a scanning speed ranging from 1° C./min to 20° C./min, in an inert nitrogen atmosphere.

The DSC—Differential Scanning calorimetry—thermal analysis, for the purpose of determining the glass transition temperature ($T_g$) of the butadiene-isoprene diblock copolymers obtained, was performed by means of the aforementioned calorimeter, using the following thermal program: isotherm for 3 min at +70° C.; cooling from +70° C. to -90° C. at a speed of 10° C./min; isotherm for 3 min at -90° C.; heating from -90° C. to +70° C. at a speed of 10° C./min.

Determination of the Molecular Weight

The determination of the molecular weight (MW) of the butadiene-isoprene diblock copolymers object of the present invention was performed through GPC (Gel Permeation Chromatography), using the Waters® Alliance® GPCN 2000 System by Waters Corporation which uses two detection lines: "Refractive Index"—RI and "Viscometer" operating under the following conditions:

two PLgel Mixed-B columns;
solvent/eluent: 1,2-dichlorobenzene (Aldrich);
flow rate: 0.8 ml/min;
temperature: 145° C.;
molecular mass calculation: Universal Calibration method.

The weight-average molecular weight ($M_w$) and the polydispersion index (PDI) are reported, corresponding to the ratio $M_w/M_n$ ($M_n$=number average molecular weight).

AFM—Atomic Force Microscopy

For the purpose, a thin film of the butadiene-isoprene diblock copolymer object of the present invention to be analyzed was prepared, by depositing a solution in chloroform or in toluene, of said copolymer, through spin-coating on a silicon substrate.

The analysis was performed in the absence of dynamic contact (not contact mode or tapping mode), using an NTEGRA Spectra Atomic Force Microscope made by N-MDT. During the scanning of the surface of said thin film, the amplitude variations of the oscillations of the tip provide topographic information related to the surface thereof (HEIGHT image). Furthermore, the phase variations of the oscillations of the tip may be used to discriminate between different types of materials present on the surface of said film (different material phases). By way of example, FIGS. 13 and 23 below show the images obtained from the analysis performed on the butadiene-isoprene diblock copolymers formed by the crystalline polybutadiene (hard block)-amorphous polyisoprene (soft block) of Example 10 and Example 16, respectively, which can be compared with the images of FIG. 27 obtained from the analysis performed on the mechanical mixture of two homopolymers (Example 19).

Example 1

Synthesis of Fe(bipy)Cl$_2$

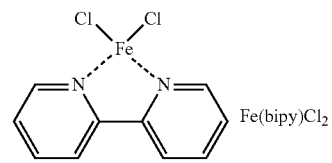

Fe(bipy)Cl$_2$ 0.585 g (4.61 mmoles) of anhydrous iron dichloride (FeCl$_2$) and 60 ml of ethanol (anhydrous and degassed) were loaded into a 250 ml flask, in an inert atmosphere: the whole was left, under stirring, at 60° C., until the dissolution of the anhydrous iron dichloride (FeCl$_2$). Subsequently, 0.504 g (3.23 mmoles) of 2,2'-bipyridine (bipy) dissolved in 30 ml of ethanol (anhydrous and degassed) were added slowly: the whole was left under stirring, in an inert atmosphere, at 60° C., for 5 minutes. The suspension obtained was cooled to room temperature, and the solid obtained was recovered by filtration, washed with ethanol (anhydrous and degassed) (2×5 ml) and vacuum dried, at room temperature, obtaining 0.730 g of a solid product corresponding to the complex Fe(bipy)Cl$_2$, equal to an 80% conversion relative to the 2,2'-bipyridine (bipy) loaded.

Molecular weight (MW): 282.93.

Elementary analysis [found (calculated for $C_{10}H_8Cl_2FeN_2$)]: C: 42.55% (42.45%), H: 2.96% (2.85%), N: 9.80% (9.90%), Cl: 25.30% (25.06%), Fe: 19.82% (19.74%).

Example 2

Synthesis of Fe(phen)Cl$_2$

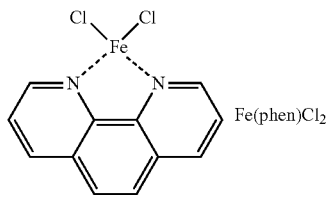

Fe(phen)Cl$_2$

0/24 g (5.71 mmoles) of anhydrous iron dichloride (FeCl$_2$) and 65 ml of ethanol (anhydrous and degassed) were loaded into a 250 ml flask, in an inert atmosphere: the whole was left, under stirring, in an inert atmosphere, at 60° C., until the dissolution of the anhydrous iron dichloride (FeCl$_2$). Subsequently, 0.721 g (4 mmoles) of 1,10-phenanthroline (phen) dissolved in 40 ml of ethanol (anhydrous and degassed) were added slowly: the whole was left under stirring, in an inert atmosphere, at 60° C., for 5 minutes. The solution obtained was cooled to room temperature, and the precipitate obtained was recovered by filtration, washed with ethanol (anhydrous and degassed) (2×5 ml) and vacuum dried, at room temperature, obtaining 0.983 g of a solid product corresponding to the complex Fe(phen)Cl$_2$, equal to an 80% conversion relative to the 1,10-phenanthroline (phen) loaded.

Molecular weight (MW): 306.96.

Elementary analysis [found (calculated for $C_{12}H_8Cl_2FeN_2$)]: C: 46.87% (46.95%), H: 2.66% (2.63%), N: 9.20% (9.13%), Cl: 23.35% (23.10%), Fe: 18.22% (18.19%).

Example 3

Synthesis of Fe(bipy)$_2$Cl$_2$

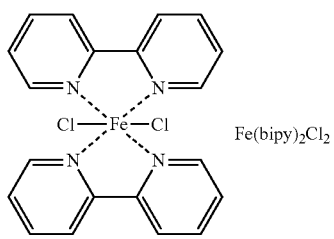

Fe(bipy)$_2$Cl$_2$ 1.29 g (6.5 mmoles) of iron dichloride tetrahydrate (FeCl$_2$.4H$_2$O), 30 ml of water and 3.05 g (19.5 mmoles) of 2,2'-bipyridine (bipy) were loaded, in an inert atmosphere, into a 100 ml flask: the whole was left, under stirring, at room temperature, for 1 hour. The reaction mixture obtained was vacuum dried, at 50° C., obtaining a solid that was vacuum heated at 100° C., for 12 hours, in the presence of phosphoric anhydride (P$_2$O$_5$) obtaining 2.4 g of a solid product corresponding to the complex Fe(bipy)$_2$Cl$_2$, equal to an 85% conversion relative to the iron dichloride tetrahydrate (FeCl$_2$'4H$_2$O) loaded.

Molecular weight (MW): 439.12.

Elementary analysis [found (calculated for $C_{20}H_{16}Cl_2FeN_4$)]: C: 54.75% (54.70%), H: 3.82% (3.67%), N: 12.67% (12.76%), Cl: 15.97% (16.15%), Fe: 12.60% (12.72%).

Example 4

Synthesis of Fe(phen)$_2$Cl$_2$

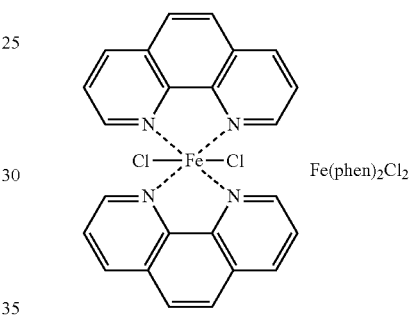

Fe(phen)$_2$Cl$_2$ 1.29 g (6.5 mmoles) of iron dichloride tetrahydrate (FeCl$_2$.4H$_2$O), 30 ml of water and 3.62 g (19.5 mmoles) of 1,10-phenanthroline (phen) were loaded, in an inert atmosphere, into a 100 ml flask: the whole was left, under stirring, at room temperature, for 1 hour. The reaction mixture obtained was vacuum dried, at 50° C., obtaining a solid that was vacuum heated at 160° C., for 12 hours, in the presence of phosphoric anhydride (P$_2$O$_5$) obtaining 2.7 g of a solid product corresponding to the complex Fe(phen)$_2$Cl$_2$, equal to an 85% conversion relative to the iron dichloride tetrahydrate (FeCl$_2$.4H$_2$O) loaded.

Molecular weight (MW): 487.16.

Elementary analysis [found (calculated for $C_{24}H_{16}Cl_2FeN_4$)]: C: 59.23% (59.17%), H: 3.56% (3.31%), N: 11.58% (11.50%), Cl: 14.62% (14.55%), Fe: 11.66% (11.46%).

Example 5

Synthesis of Crystalline Polybutadiene Having a 64.6% Content of 1,2 Syndiotactic Units (Reference Homopolymer)

2 ml of 1,3-butadiene equal to about 1.4 g were condensed, cold (−20° C.), in a 25 ml test tube. Subsequently, 14.59 ml of toluene were added and the temperature of the solution thus obtained was brought to +40° C. Then, methylaluminoxane (MAO) in toluene solution (0.315 ml; $5×10^{-4}$ moles, equal to about 0.029 g) was added, and, subsequently, the Fe(bipy)$_2$Cl$_2$ (1.1 ml of toluene solution at a concentration of 2 mg/ml; $5×10^{-6}$ moles, equal to about 2.2 mg) obtained as described in Example 3. The whole was kept, under magnetic stirring, at +40° C., for 5 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 1,4 g of polybutadiene having a 1,2-cis syndiotactic unit content of 64.6%: further characteristics of the procedure and of the polybutadiene obtained are reported in Table 1.

Figure 2:
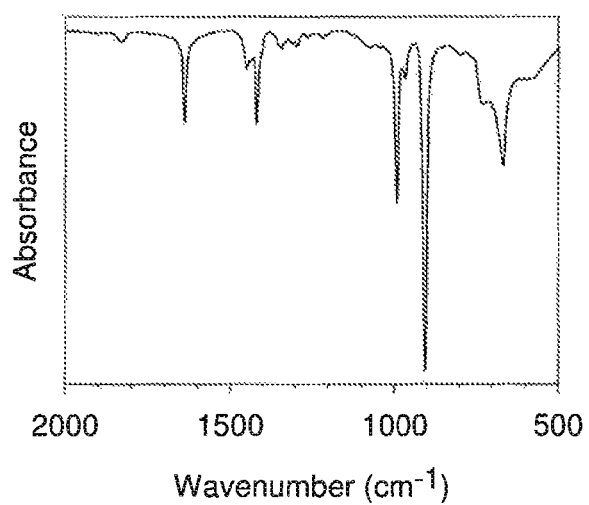
FIG. 2 shows the FT-IR spectrum of polybutadiene obtained in Example 5.

FIG. 2 shows the FT-IR spectrum of the polybutadiene obtained.

Figure 3:
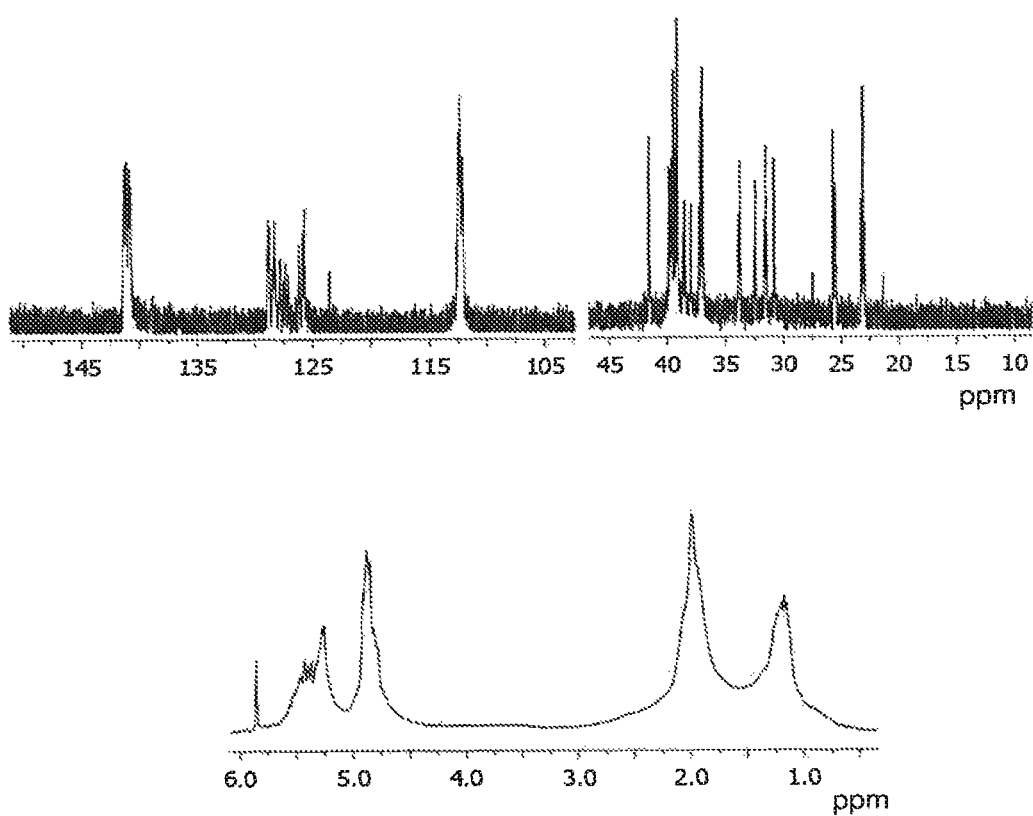
FIG. 3 shows the $^1$H-NMR (bottom) and $^{13}$C-NMR (top) spectra of polybutadiene obtained in Example 5.

FIG. 3 shows the $^1$H-NMR (bottom) and $^{13}$C-NMR (top) spectra of the polybutadiene obtained.

Example 6

Synthesis of Crystalline Polybutadiene 68.3% Content of 1,2 Syndiotactic Units (Reference Homopolymer)

2 ml of 1,3-butadiene equal to about 1.4 g were condensed, cold (−20° C.), in a 25 ml test tube. Subsequently, 14.59 ml of toluene were added and the temperature of the solution thus obtained was brought to +22° C. Then, methylaluminoxane (MAO) in toluene solution (0,315 ml; $5×10^{-4}$ moles, equal to about 0.029 g) was added, and, subsequently, the Fe(bipy)$_2$Cl$_2$ (1.1 ml of toluene solution at a concentration of 2 mg/ml; $5×10^{-6}$ moles, equal to about 2.2 mg) obtained as described in Example 3. The whole was kept, under magnetic stirring, at +22° C., for 5 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 1.4 g of polybutadiene having a 1,2-cis syndiotactic unit content of 68.3%: further characteristics of the procedure and of the polybutadiene obtained are reported in Table 1.

Figure 4:
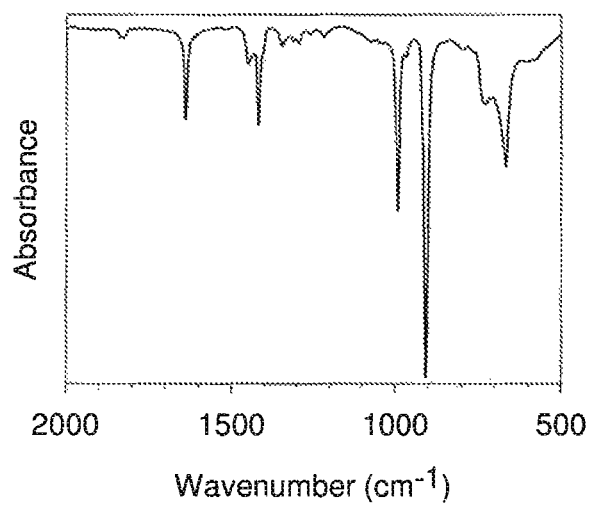
FIG. 4 shows the FT-IR spectrum of polybutadiene obtained in Example 6.

FIG. 4 shows the FT-IR spectrum of the polybutadiene obtained.

Figure 5:
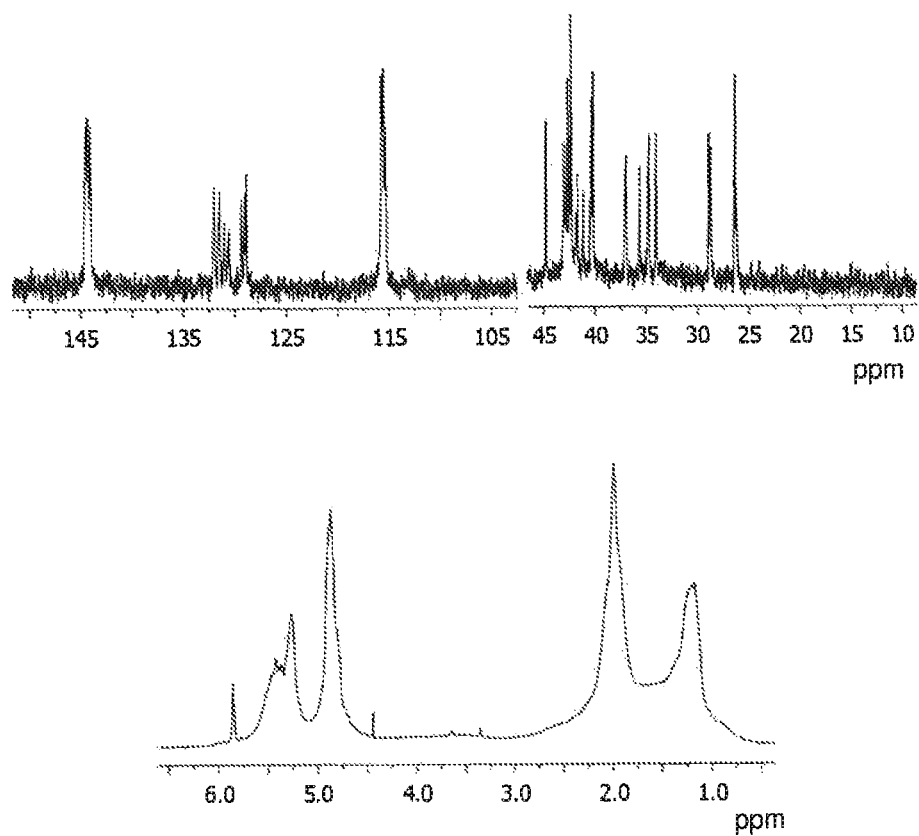
FIG. 5 shows the $^1$H-NMR (bottom) and $^{13}$C-NMR (top) spectra of polybutadiene obtained in Example 6.

FIG. 5 shows the $^1$H-NMR (bottom) and $^{13}$C-NMR (top) spectra of the polybutadiene obtained.

Example 7

Synthesis of Crystalline Polybutadiene Having a 77.4% Content of 1,2 Syndiotactic Units (Reference Homopolymer)

2 ml of 1,3-butadiene equal to about 1.4 g were condensed, cold (−20° C.), in a 25 ml test tube. Subsequently, 14.59 ml of toluene were added and the temperature of the solution thus obtained was brought to 0° C. Then, methylaluminoxane (MAO) in toluene solution (0.315 ml; $5×10^{-4}$ moles, equal to about 0.029 g) was added, and, subsequently, the Fe(bipy)$_2$Cl$_2$ (1.1 ml of toluene solution at a concentration of 2 mg/ml; $5×10^{-6}$ moles, equal to about 2.2 mg) obtained as described in Example 3. The whole was kept, under magnetic stirring, at 0° C., for 15 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 1.4 g of polybutadiene having a 1,2-cis syndiotactic unit content of 77.4%: further characteristics of the procedure and of the polybutadiene obtained are reported in Table 1.

Figure 6:
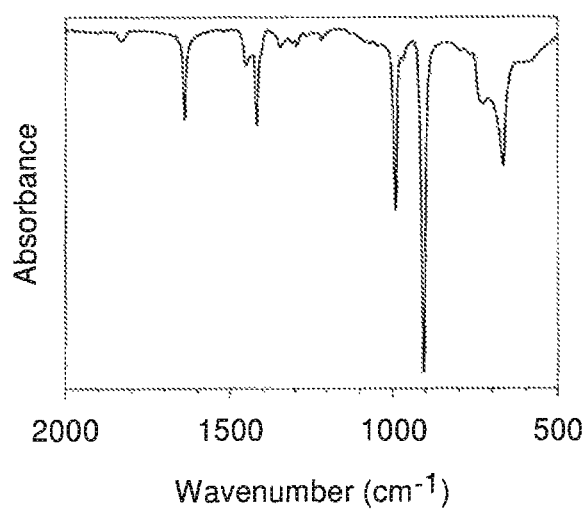
FIG. 6 shows the FT-IR spectrum of polybutadiene obtained in Example 7.

FIG. 6 shows the FT-IR spectrum of the polybutadiene obtained.

Figure 7:
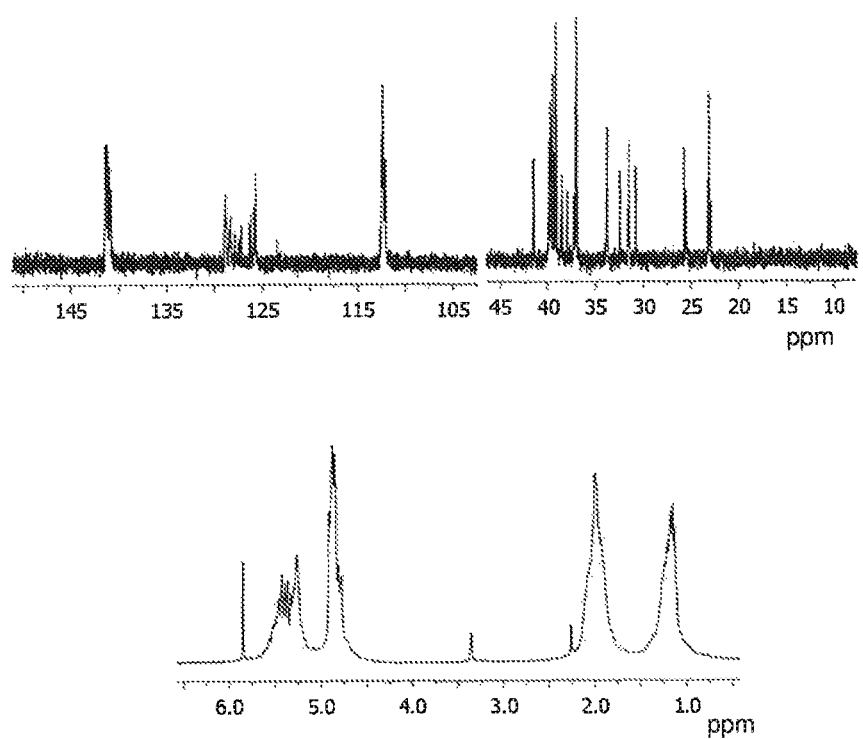
FIG. 7 shows the $^1$H-NMR (bottom) and $^{13}$C-NMR (top) spectra of polybutadiene obtained in Example 7.

FIG. 7 shows the $^1$H-NMR (bottom) and $^{13}$C-NMR (top) spectra of the polybutadiene obtained.

Example 8

Synthesis of Crystalline Polybutadiene Having a 83.2% Content of 1,2 Syndiotactic Units (Reference Homopolymer)

2 ml of 1,3-butadiene equal to about 1.4 g were condensed, cold (−20° C.), in a 25 ml test tube. Subsequently, 14.59 ml of toluene were added and the temperature of the solution thus obtained was brought to −20° C. Then, methylaluminoxane (MAO) in toluene solution (0.315 ml; $5×10^{-4}$ moles, equal to about 0.029 g) was added, and, subsequently, the Fe(bipy)$_2$Cl$_2$ (1.1 ml of toluene solution at a concentration of 2 mg/ml; $5×10^{-6}$ moles, equal to about 2.2 mg) obtained as described in Example 3. The whole was kept, under magnetic stirring, at −20° C., for 30 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 1.4 g of polybutadiene having a 1,2-cis syndiotactic unit content of 83.2%: further characteristics of the procedure and of the polybutadiene obtained are reported in Table 1.

Figure 8:
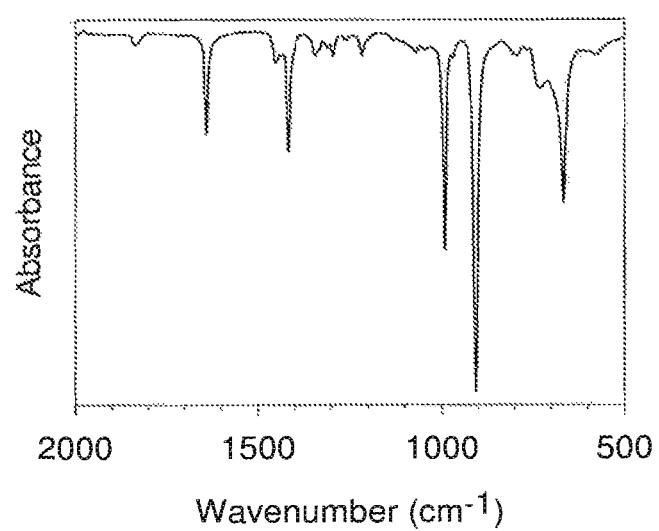
FIG. 8 shows the FT-IR spectrum of polybutadiene obtained in Example 8.

FIG. 8 shows the FT-IR spectrum of the polybutadiene obtained.

Figure 9:
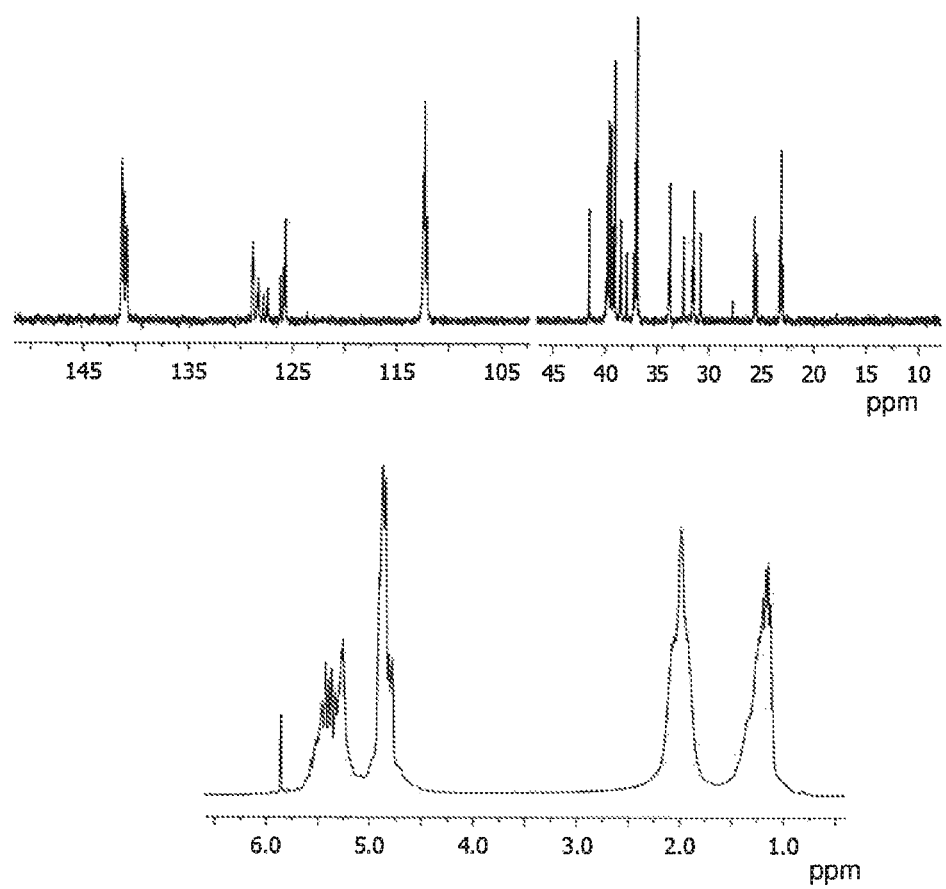
FIG. 9 shows the $^1$H-NMR (bottom) and $^{13}$C-NMR (top) spectra of polybutadiene obtained in Example 8.

FIG. 9 shows the $^1$H-NMR (bottom) and $^{13}$C-NMR (top) spectra of the polybutadiene obtained.

Example 9

Synthesis of Amorphous Polyisoprene Having a 67.0% Content of 3,4 Atactic Units (Reference Homopolymer)

2 ml of isoprene equal to about 1.36 g were loaded into a 25 ml test tube. Subsequently, 14.59 ml of toluene were added and the temperature of the solution thus obtained was brought to +20° C. Then, methylaluminoxane (MAO) in toluene solution (0.315 ml; $5×10^{-4}$ moles, equal to about 0.029 g) was added, and, subsequently, the Fe(bipy)$_2$Cl$_2$ (1.1 ml of toluene solution at a concentration of 2 mg/ml; $5×10^{-6}$ moles, equal to about 2.2 mg) obtained as described in Example 3. The whole was kept, under magnetic stirring, at +20° C., for 5 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 1.36 g of polyisoprene having a 3,4-cis atactic unit content of 67.0%: further characteristics of the procedure and of the polyisoprene obtained are reported in Table 1.

Figure 10:
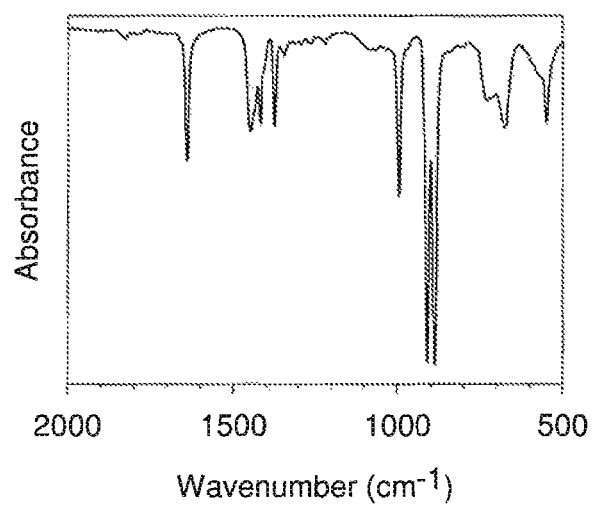
FIG. 10 shows the FT-IR spectrum of polyisoprene obtained in Example 9.

FIG. 10 shows the FT-IR spectrum of the polyisoprene obtained.

Figure 11:
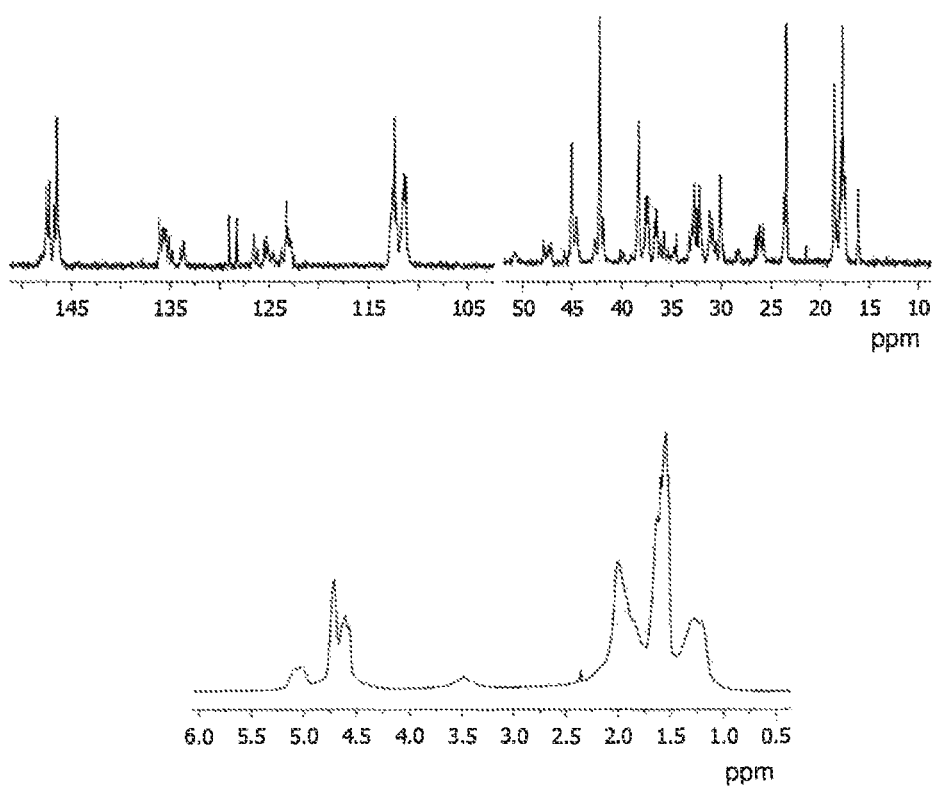
FIG. 11 shows the $^1$H-NMR (bottom) and $^{13}$C-NMR (top) spectra of polyisoprene obtained in Example 9.

FIG. 11 shows the $^1$H-NMR (bottom) and $^{13}$C-NMR (top) spectra of the polyisoprene obtained.

Example 10

Synthesis of Butadiene-Isoprene Diblock Copolymer Formed Crystalline Polybutadiene (Hard Block)-Amorphous Polyisoprene (Soft Block) (Invention)

2 ml of 1,3-butadiene equal to 1.4 g in toluene solution (56.6 ml) and methylaluminoxane (MAO) in toluene solution (0.315 ml; $5 \times 10^{-4}$ moles, equal to about 0.029 g) were loaded into a 100 ml test tube cooled to $-20°$ C.: the solution obtained was brought to $+40°$ C. and, subsequently, the Fe(bipy)$_2$Cl$_2$ complex (1.1 ml of toluene solution at a concentration of 2 mg/ml; $5 \times 10^{-6}$ moles, equal to about 2.2 mg) obtained as described in Example 3, was added. The whole was kept, under magnetic stirring, at $+40°$ C., for 30 minutes and, subsequently, 2 ml of isoprene equal to about 1.36 g in toluene solution (8 ml) were added. The polymerization was left to proceed, under magnetic stirring, at $+40°$ C., for a further 30 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 2.76 g of butadiene-isoprene diblock copolymer formed by a block of crystalline polybutadiene (hard block) having a 1,2 syndiotactic unit content of 65.0% and by a block of amorphous polyisoprene (soft block) having a 3,4 atactic unit content of 69.2%: further characteristics of the procedure and of the butadiene-isoprene diblock copolymer obtained are reported in Table 1.

Figure 12:
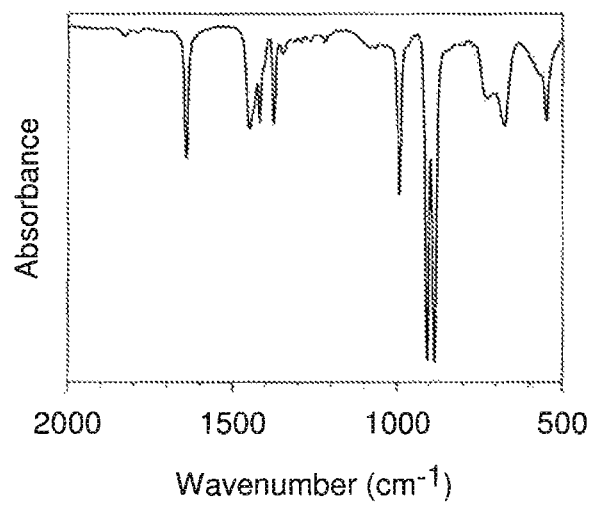
FIG. 12 shows the FT-IR spectrum of butadiene-isoprene diblock copolymer obtained in Example 10.

FIG. 12 shows the FT-IR spectrum of the butadiene-isoprene diblock copolymer obtained.

Figure 13:
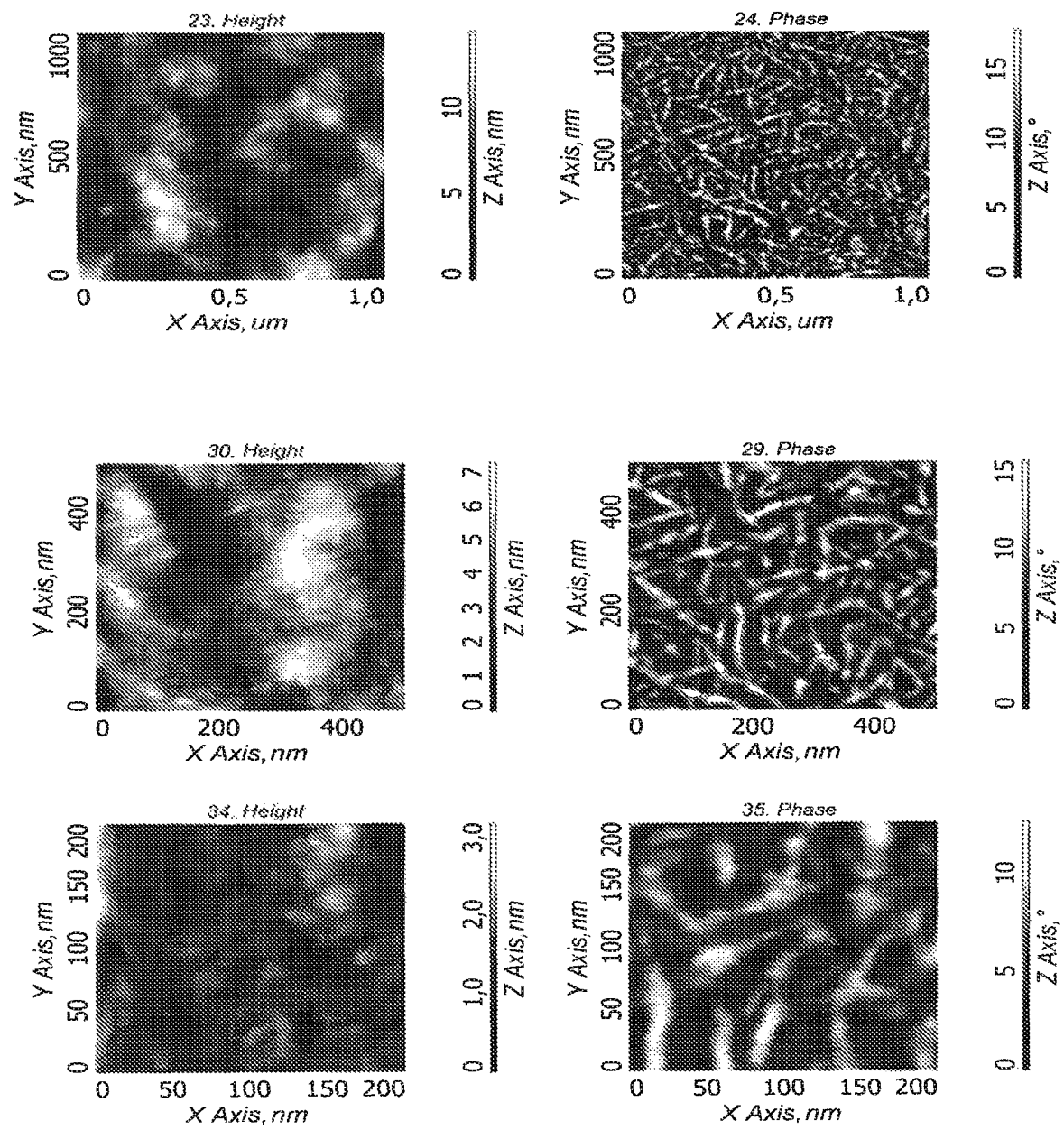
FIG. 13 shows the phase images obtained through AFM-Atomic Force Microscopy—of butadiene-isoprene diblock copolymer obtained in Example 10.

FIG. 13 shows the phase images obtained through AFM—Atomic Force Microscopy—of the butadiene-isoprene diblock copolymer obtained.

Example 11

Synthesis of Butadiene-Isoprene Diblock Copolymer Formed by Crystalline Polybutadiene (Hard Block)-Amorphous Polyisoprene (Soft Block) (Invention)

3 ml of 1,3-butadiene equal to 2.1 g in toluene solution (56.6 ml) and methylaluminoxane (MAO) in toluene solution (0.315 ml; $5 \times 10^{-4}$ moles, equal to about 0.029 g) were loaded into a 100 ml test tube cooled to $-20°$ C.: the solution obtained was brought to $+40°$ C. and, subsequently, the Fe(bipy)$_2$Cl$_2$ complex (1.1 ml of toluene solution at a concentration of 2 mg/ml; $5 \times 10^{-6}$ moles, equal to about 2.2 mg) obtained as described in Example 3, was added. The whole was kept, under magnetic stirring, at $+40°$ C., for 30 minutes and, subsequently, 1 ml of isoprene equal to about 0.68 g in toluene solution (8 ml) was added: the polymerization was left to proceed, under magnetic stirring, at $+40°$ C., for a further 45 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 2.78 g of butadiene-isoprene diblock copolymer formed by a block of crystalline polybutadiene (hard block) having a 1,2 syndiotactic unit content of 65.3% and by a block of amorphous polyisoprene (soft block) having a 3,4 atactic unit content of 69.5%: further characteristics of the procedure and of the butadiene-isoprene diblock copolymer obtained are reported in Table 1.

Figure 14:
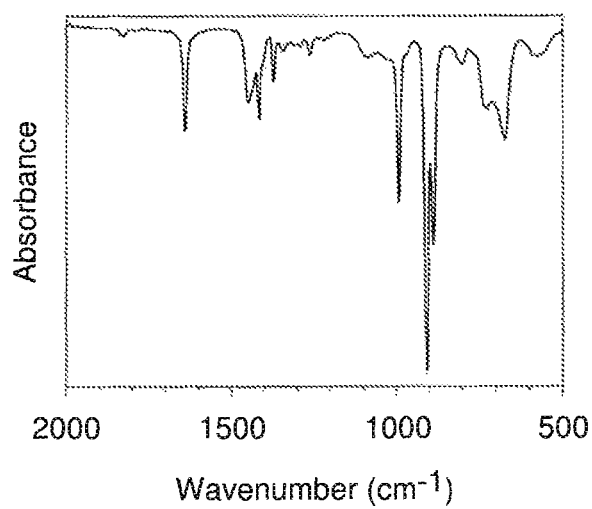
FIG. 14 shows the FT-IR spectrum of butadiene-isoprene diblock copolymer obtained in Example 11.

FIG. 14 shows the FT-IR spectrum of the butadiene-isoprene diblock copolymer obtained.

Example 12

Synthesis of Butadiene-Isoprene Diblock Copolymer Formed by Crystalline Polybutadiene (Hard Block)-Amorphous Polyisoprene (Soft Block) (Invention)

1 ml of 1,3-butadiene equal to 0.7 g in toluene solution (56.6 ml) and methylaluminoxane (MAO) in toluene solution (0.315 ml; $5 \times 10^{-4}$ moles, equal to about 0.029 g) were loaded into a 100 ml test tube cooled to $-20°$ C.: the solution obtained was brought to $+40°$ C. and, subsequently, the Fe(bipy)$_2$Cl$_2$ complex (1.1 ml of toluene solution at a concentration of 2 mg/ml; $5 \times 10^{-6}$ moles, equal to about 2.2 mg) obtained as described in Example 3, was added. The whole was kept, under magnetic stirring, at $+40°$ C., for 45 minutes and, subsequently, 3 ml of isoprene equal to about 2.04 g in toluene solution (8 ml) were added: the polymerization was left to proceed, under magnetic stirring, at $+40°$ C., for a further 60 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 2.76 g of butadiene-isoprene diblock copolymer formed by a block of crystalline polybutadiene (hard block) having a 1,2 syndiotactic unit content of 66.6% and by a block of amorphous polyisoprene (soft block) having a 3,4 atactic unit content of 73%: further characteristics of the procedure and of the butadiene-isoprene diblock copolymer obtained are reported in Table 1.

Figure 15:
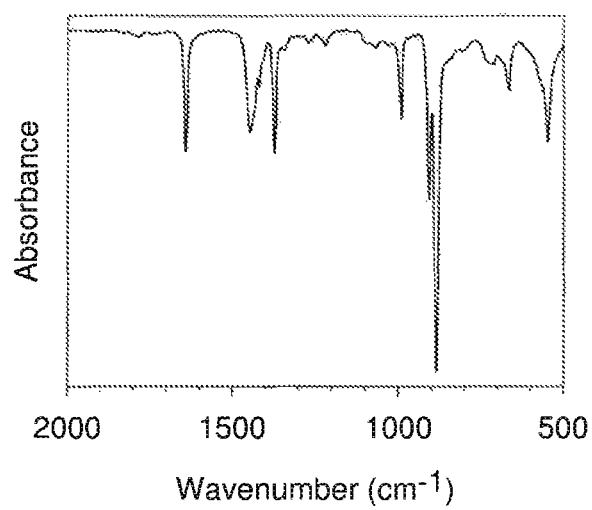
FIG. 15 shows the FT-IR spectrum of butadiene-isoprene diblock copolymer obtained in Example 12.

FIG. 15 shows the FT-IR spectrum of the butadiene-isoprene diblock copolymer obtained.

Figure 16:
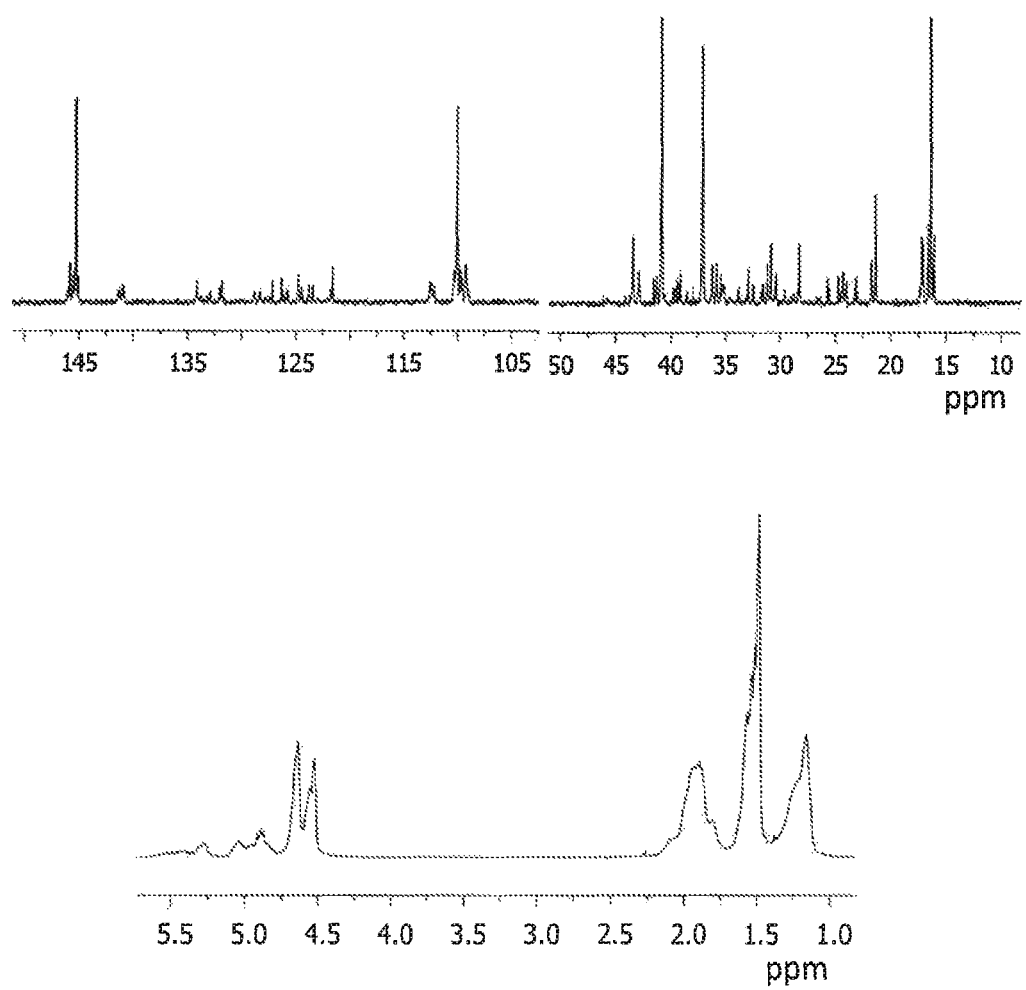
FIG. 16 shows the $^1$H-NMR (bottom) and $^{13}$C-NMR (top) spectra of butadiene-isoprene diblock copolymer obtained in Example 12.

FIG. 16 shows the $^1$H-NMR (bottom) and $^{13}$C-NMR (top) spectra of the butadiene-isoprene diblock copolymer obtained.

Example 13

Synthesis of Butadiene-Isoprene Diblock Copolymer Formed by Crystalline Polybutadiene (Hard Block)-Amorphous Polyisoprene (Soft Block) (Invention)

2 ml of 1,3-butadiene equal to 1.4 g in toluene solution (57 ml) and methylaluminoxane (MAO) in toluene solution (0.315 ml; $5 \times 10^{-4}$ moles. equal to about 0.029 g) were loaded into a 100 ml test tube cooled to $-20°$ C.: the solution obtained was brought to $+22°$ C. and, subsequently, the Fe(bipy)Cl$_2$ complex (0.7 ml of toluene solution at a concentration of 2 mg/ml; $5 \times 10^{-6}$ moles, equal to about 1.4 mg) obtained as described in Example 1, was added. The whole was kept, under magnetic stirring, at $+22°$ C., for 75 minutes and, subsequently, 2 ml of isoprene equal to about 1.36 g in toluene solution (8 ml) were added: the polymerization was left to proceed, under magnetic stirring, at $+22°$ C., for a further 60 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 2.76 g of butadiene-isoprene diblock copolymer formed by a block of crystalline polybutadiene (hard block) having a 1,2 syndiotactic unit content of 66.9% and by a block of amorphous polyisoprene (soft block) having a 3,4 atactic unit content of 68%: further characteristics of the procedure and of the butadiene-isoprene diblock copolymer obtained are reported in Table 1.

Figure 17:
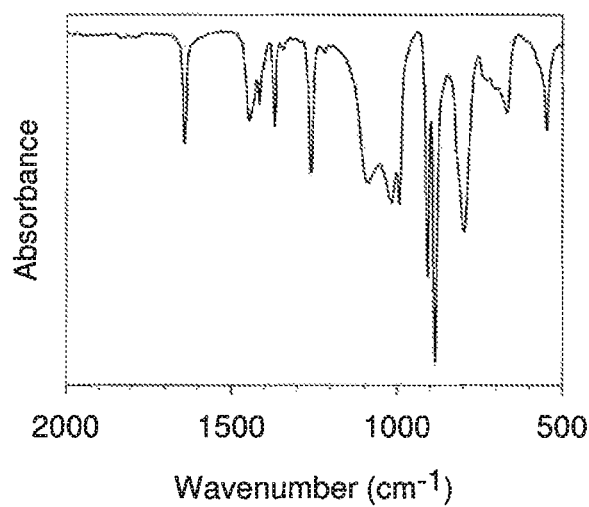
FIG. 17 shows the FT-IR spectrum of butadiene-isoprene diblock copolymer obtained in Example 13.

FIG. 17 shows the FT-IR spectrum of the butadiene-isoprene diblock copolymer obtained.

Figure 18:
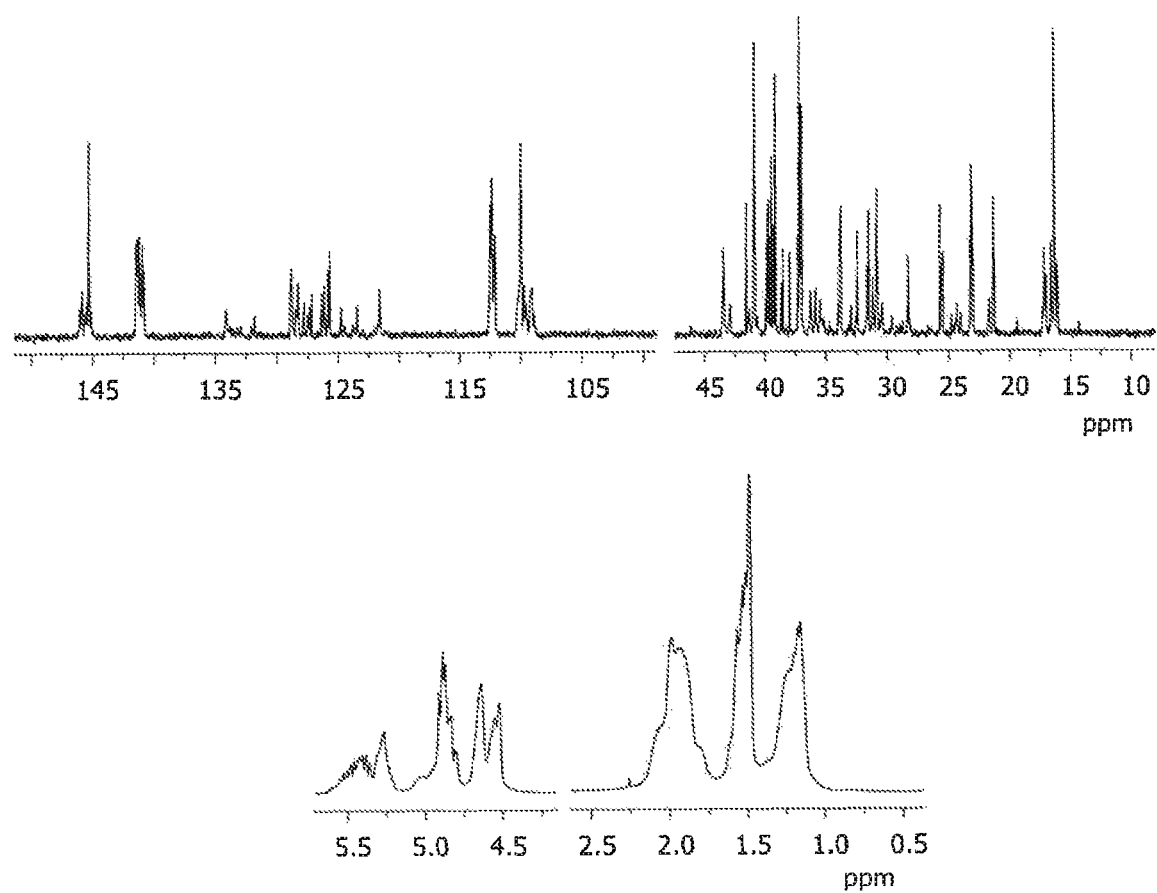
FIG. 18 shows the $^1$H-NMR (bottom) and $^{13}$C-NMR (top) spectra of butadiene-isoprene diblock copolymer obtained in Example 13.

FIG. 18 shows the $^1$H-NMR (bottom) and $^{13}$C-NMR (top) spectra of the butadiene-isoprene diblock copolymer obtained.

Example 14

Synthesis of Butadiene-Isoprene Diblock Copolymer Formed by Crystalline Polybutadiene (Hard Block)-Amorphous Polyisoprene (Soft Block) (Invention)

1 ml of 1,3-butadiene equal to 0.7 g in toluene solution (57 ml) and methylaluminoxane (MAO) in toluene solution (0.315 ml; $5/10^{-4}$ moles, equal to about 0.029 g) was loaded into a 100 ml test tube cooled to −20° C.: the solution obtained was brought to +22° C. and, subsequently, the Fe(bipy)Cl$_2$ complex (0.7 ml of toluene solution at a concentration of 2 mg/ml; 5×10 moles, equal to about 1.4 mg) obtained as described in Example 1, was added. The whole was kept, under magnetic stirring, at +22° C., for 60 minutes and, subsequently, 3 ml of isoprene equal to about 2.04 g in toluene solution (8 ml) were added: the polymerization was left to proceed, under magnetic stirring, at +22° C., for a further 75 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 2.74 g of butadiene-isoprene diblock copolymer formed by a block of crystalline polybutadiene (hard block) having a 1,2 syndiotactic unit content of 68.0% and by a block of amorphous polyisoprene (soft block) having a 3,4 atactic unit content of 68.7%: further characteristics of the procedure and of the butadiene-isoprene diblock copolymer obtained are reported in Table 1.

Figure 19:
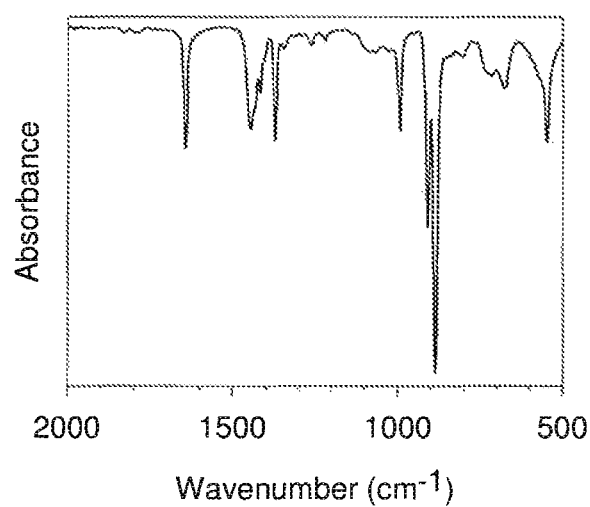
FIG. 19 shows the FT-IR spectrum of butadiene-isoprene diblock copolymer obtained in Example 14.

FIG. 19 shows the FT-IR spectrum of the butadiene-isoprene diblock copolymer obtained.

Example 15

Synthesis of Butadiene-Isoprene Diblock Copolymer Formed by Crystalline Polybutadiene (Hard Block)-Amorphous Polyisoprene (Soft Block) (Invention)

2 ml of 1,3-butadiene equal to 1.4 g in toluene solution (56.5 ml) and methylaluminoxane (MAO) in toluene solution (0.315 ml; 5×10$^{-4}$ moles, equal to about 0.029 g) were loaded into a 100 ml test tube cooled to −20° C.: the solution obtained was brought to 0° C. and, subsequently, the Fe(phen)$_2$Cl$_2$ complex (1.2 ml of toluene solution at a concentration of 2 mg/ml; 5×10$^{-6}$ moles, equal to about 2.4 mg) obtained as described in Example 4, was added. The whole was kept, under magnetic stirring, at 0° C., for 75 minutes and, subsequently, the temperature was brought to +22° C. and 2 ml of isoprene equal to about 1.36 g in toluene solution (8 ml) were added: the polymerization was left to proceed, under magnetic stirring, at +22° C., for a further 90 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 2.74 g of butadiene-isoprene diblock copolymer formed by a block of crystalline polybutadiene (hard block) having a 1,2 syndiotactic unit content of 71.8% and by a block of amorphous polyisoprene (soft block) having a 3,4 atactic unit content of 69.1%: further characteristics of the procedure and of the butadiene-isoprene diblock copolymer obtained are reported in Table 1.

Figure 20:
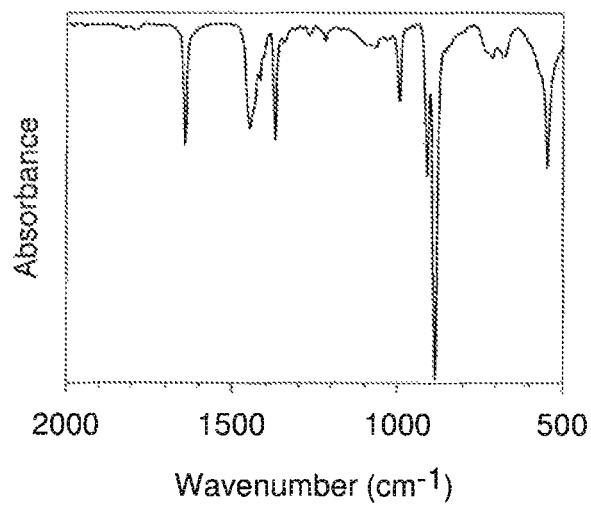
FIG. 20 shows the FT-IR spectrum of butadiene-isoprene diblock copolymer obtained in Example 15.

FIG. 20 shows the FT-IR spectrum of the butadiene-isoprene diblock copolymer obtained.

Example 16

Synthesis of Butadiene-Isoprene Diblock Copolymer Formed by Crystalline Polybutadiene (Hard Block)-Amorphous Polyisoprene (Soft Block) (Invention)

3 ml of 1,3-butadiene equal to 1.4 g in toluene solution (56.5 ml) and methylaluminoxane (MAO) in toluene solution (0.315 ml; 5×10$^{-4}$ moles, equal to about 0.029 g) were loaded into a 100 ml test tube cooled to −20° C.: the solution obtained was brought to 0° C. and, subsequently, the Fe(phen)$_2$Cl$_2$ complex (1.2 ml of toluene solution at a concentration of 2 mg/ml; 5×10$^{-6}$ moles, equal to about 2.4 mg) obtained as described in Example 4, was added. The whole was kept, under magnetic stirring, at 0° C., for 75 minutes and, subsequently, the temperature was brought to +22° C. and 1 ml of isoprene equal to about 0.68 g in toluene solution (8 ml) was added: the polymerization was left to proceed, under magnetic stirring, at +22° C., for a further 90 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 2.08 g of butadiene-isoprene diblock copolymer formed by a block of crystalline polybutadiene (hard block) having a 1,2 syndiotactic unit content of 72.9% and by a block of amorphous polyisoprene (soft block) having a 3,4 atactic unit content of 68.9%: further characteristics of the procedure and of the butadiene-isoprene diblock copolymer obtained are reported in Table 1.

Figure 21:
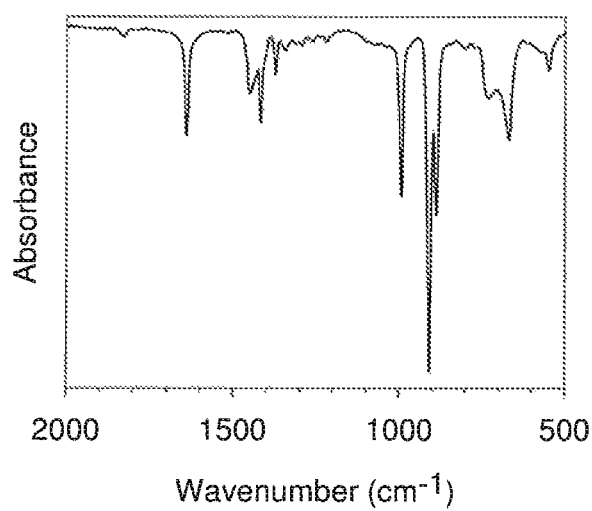
FIG. 21 shows the FT-IR spectrum of butadiene-isoprene diblock copolymer obtained in Example 16.

FIG. 21 shows the FT-IR spectrum of the butadiene-isoprene diblock copolymer obtained.

Figure 22:
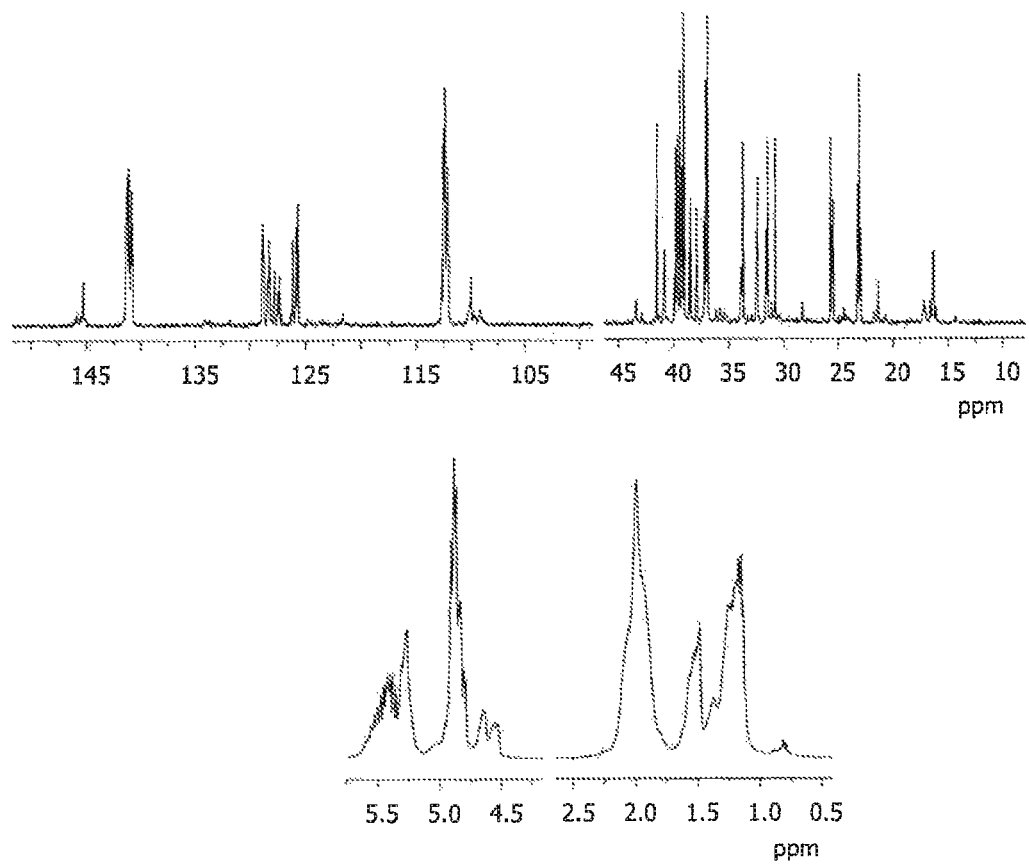
FIG. 22 shows the $^1$H-NMR (bottom) and $^{13}$C-NMR (top) spectra of butadiene-isoprene diblock copolymer obtained in Example 16.

FIG. 22 shows the $^1$H-NMR (bottom) and $^{13}$C-NMR (top) spectra of the butadiene-isoprene diblock copolymer obtained.

Figure 23:
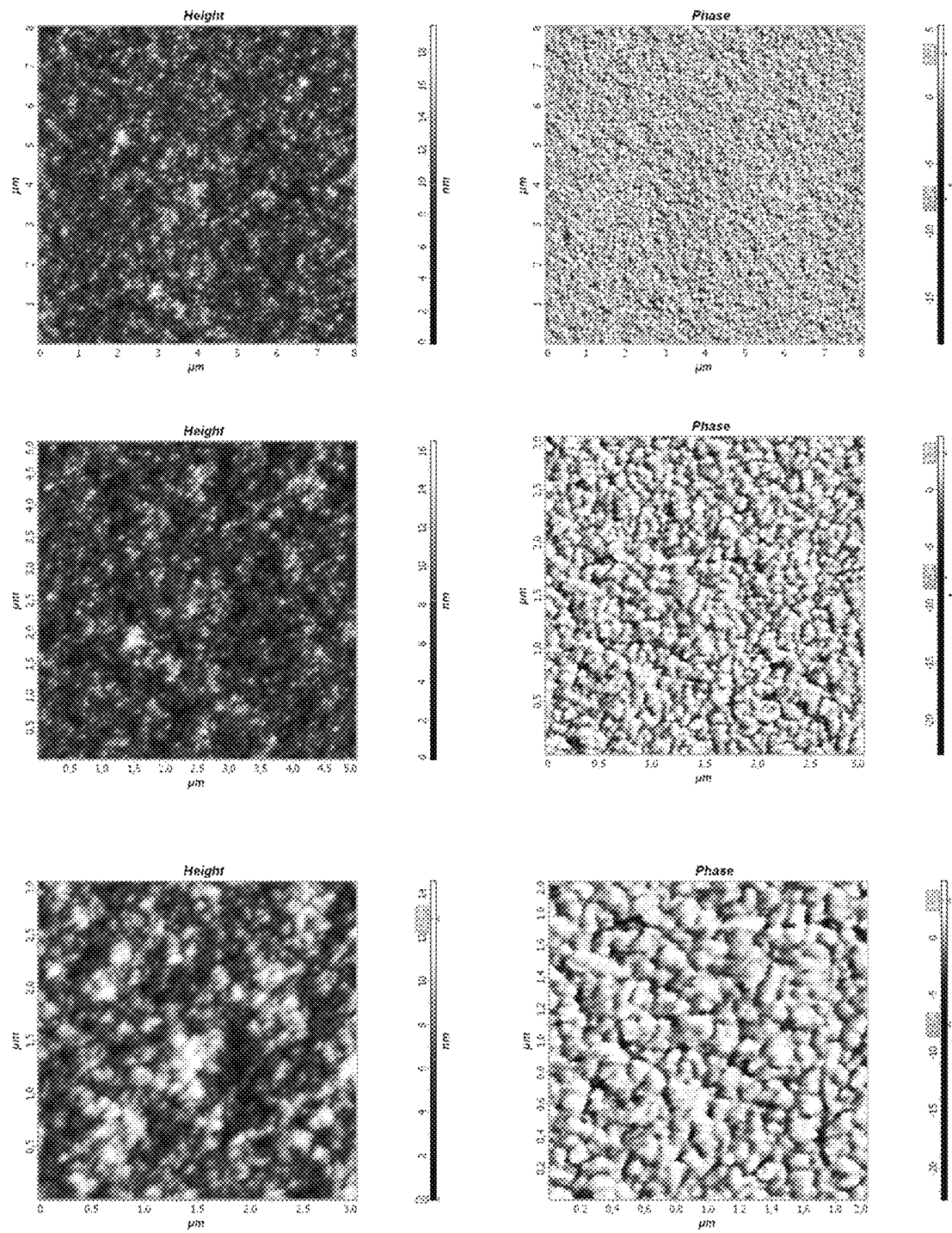
FIG. 23 shows phase images obtained through AFM-Atomic Force Microscopy—of butadiene-isoprene diblock copolymer obtained in Example 16.

FIG. 23 shows the phase images obtained through AFM—Atomic Force Microscopy—of the butadiene-isoprene diblock copolymer obtained.

Example 17

Synthesis of Butadiene Isoprene Diblock Copolymer Formed by Crystalline Polybutadiene (Hard Block)-Amorphous Polyisoprene (Soft Block) (Invention)

2 ml of 1,3-butadiene equal to 1.4 g in toluene solution (56.9 ml) and methylaluminoxane (MAO) in toluene solution (0.315 ml; 5×10$^{-4}$ moles, equal to about 0.029 g) were loaded into a 100 ml test tube cooled to −20° C.: the solution obtained was brought to −20° C. and, subsequently, the Fe(bipy)Cl$_2$ complex (0.75 ml of toluene solution at a concentration of 2 mg/ml; 5×10⁶ moles, equal to about 1.5 mg) obtained as described in Example 2, was added. The whole was kept, under magnetic stirring, at −20° C., for 90 minutes and, subsequently, the temperature was brought to +22° C. and 2 ml of isoprene equal to about 1.36 g in toluene solution (8 ml) were added. The polymerization was left to proceed, under magnetic stirring, at +22° C., for a further 120 minutes: the polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 2/6 g of butadiene-isoprene diblock copolymer formed by a block of crystalline polybutadiene (hard block) having a 1,2 syndiotactic unit content of 79.0% and by a block of amorphous polyisoprene (soft block) having a 3,4 atactic unit content of 69.9%: further characteristics of the procedure and of the butadiene-isoprene diblock copolymer obtained are reported in Table 1.

Figure 24:
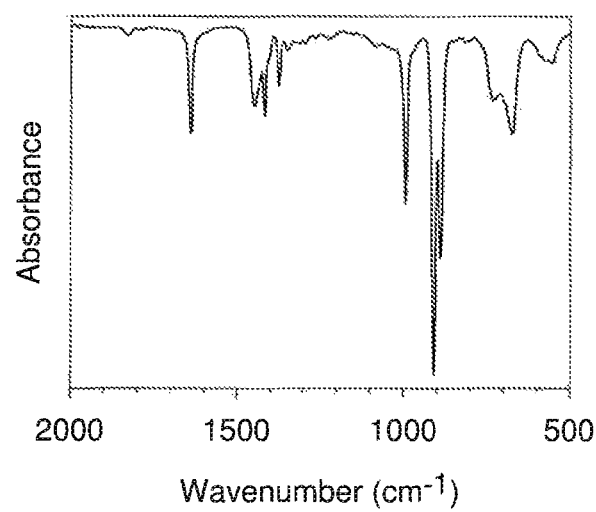
FIG. 24 shows the FT-IR spectrum of butadiene-isoprene diblock copolymer obtained in Example 17.

FIG. 24 shows the FT-IR spectrum of the butadiene-isoprene diblock copolymer obtained.

Example 18

Synthesis of Butadiene-Isoprene Diblock Copolymer Formed by Crystalline Polybutadiene (Hard Block)-Amorphous Polyisoprene (Soft Block) (Invention)

ml of 1,3-butadiene equal to 0.7 g in toluene solution (56.9 ml) and methylaluminoxane (MAO) in toluene solution (0.315 ml; 5×10⁻⁴ moles, equal to about 0.029 g) was loaded into a 100 ml test tube cooled to −20° C.: the solution obtained was brought to −20° C. and, subsequently, the Fe(bipy)Cl₂ complex (0.75 ml of toluene solution at a concentration of 2 mg/ml; 5×10⁻⁶ moles, equal to about 1.5 mg) obtained as described in Example 2, was added. The whole was kept, under magnetic stirring, at −20° C., for 120 minutes and, subsequently, the temperature was brought to +22° C. and 3 ml of isoprene equal to about 2.04 g in toluene solution (8 ml) were added: the polymerization was left to proceed, under magnetic stirring, at +22° C., for a further 180 minutes. The polymerization was then stopped by adding 2 ml of methanol containing some drops of hydrochloric acid. The polymer obtained was then coagulated by adding 40 ml of a methanol solution containing 4% of Irganox® 1076 antioxidant (Ciba) obtaining 2.74 g of butadiene-isoprene diblock copolymer formed by a block of crystalline polybutadiene (hard block) having a 1,2 syndiotactic unit content of 77.6% and by a block of amorphous polyisoprene (soft block) having a 3,4 atactic unit content of 71.2%: further characteristics of the procedure and of the butadiene-isoprene diblock copolymer obtained are reported in Table 1.

Figure 25:
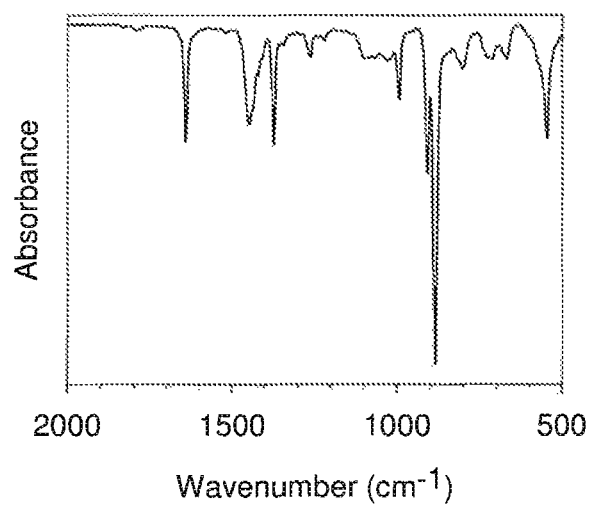
FIG. 25 shows the FT-IR spectrum of butadiene-isoprene diblock copolymer obtained in Example 18.

FIG. 25 shows the FT-IR spectrum of the butadiene-isoprene diblock copolymer obtained.

Figure 26:
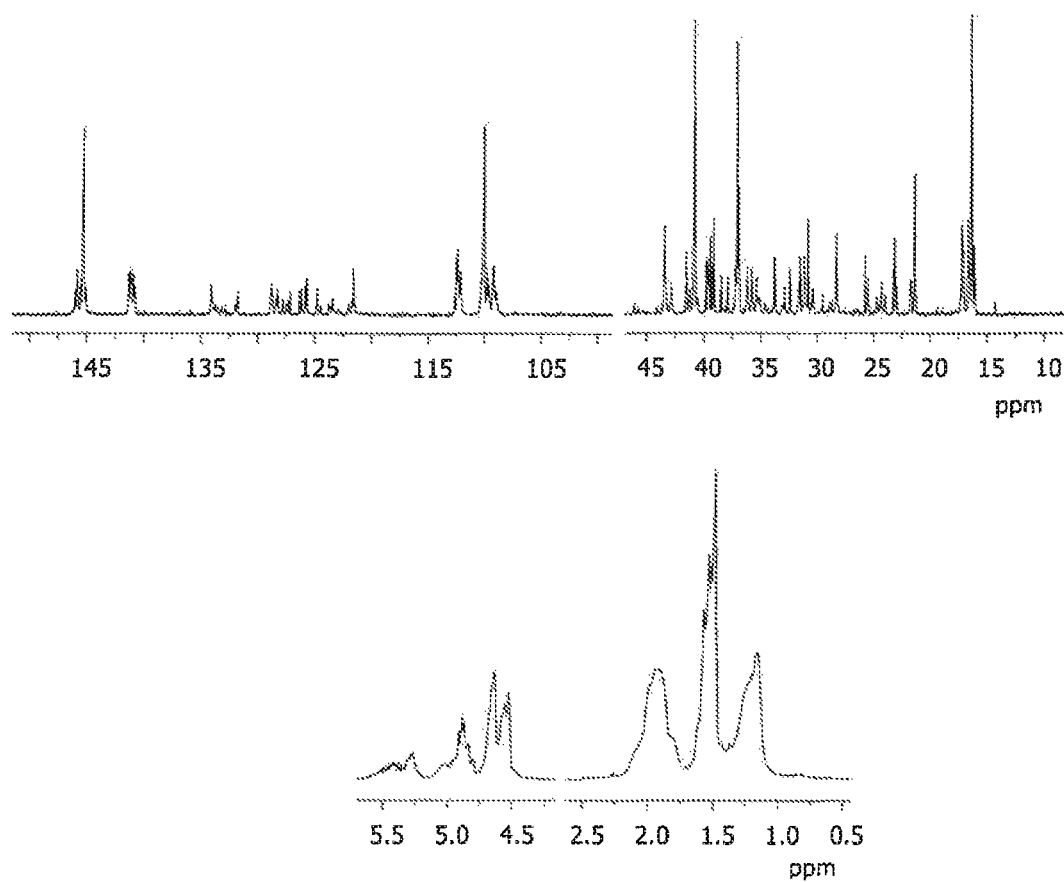
FIG. 26 shows the $^1$H-NMR (bottom) and $^{13}$C-NMR (top) spectra of butadiene-isoprene diblock copolymer obtained in Example 18.

FIG. 26 shows the ¹H-NMR (bottom) and ¹³C-NMR (top) spectra of the butadiene-isoprene diblock copolymer obtained.

Example 19

Preparation of a Mechanical Mixture of Crystalline 1,2 Syndiotactic Polybutadiene and Amorphous 3,4 Atactic Polyisoprene (Comparative)

1.54 g of crystalline polybutadiene having a 1,2 syndiotactic unit content of 77.4% obtained as described in Example 7, 0.45 g of amorphous polyisoprene having a 3,4 atactic unit content of 67.0% obtained as described in Example 9 and 50 ml of toluene were placed in a 100 ml test tube: the whole was maintained, under magnetic stirring, for 120 minutes, until complete solubilization of the two polymers, i.e. until a perfectly homogeneous solution was obtained. To the solution thus obtained, methanol in great excess (200 ml) was added, obtaining the precipitation of a solid product that was recovered through filtration and vacuum dried, at room temperature, for one night.

Figure 27:
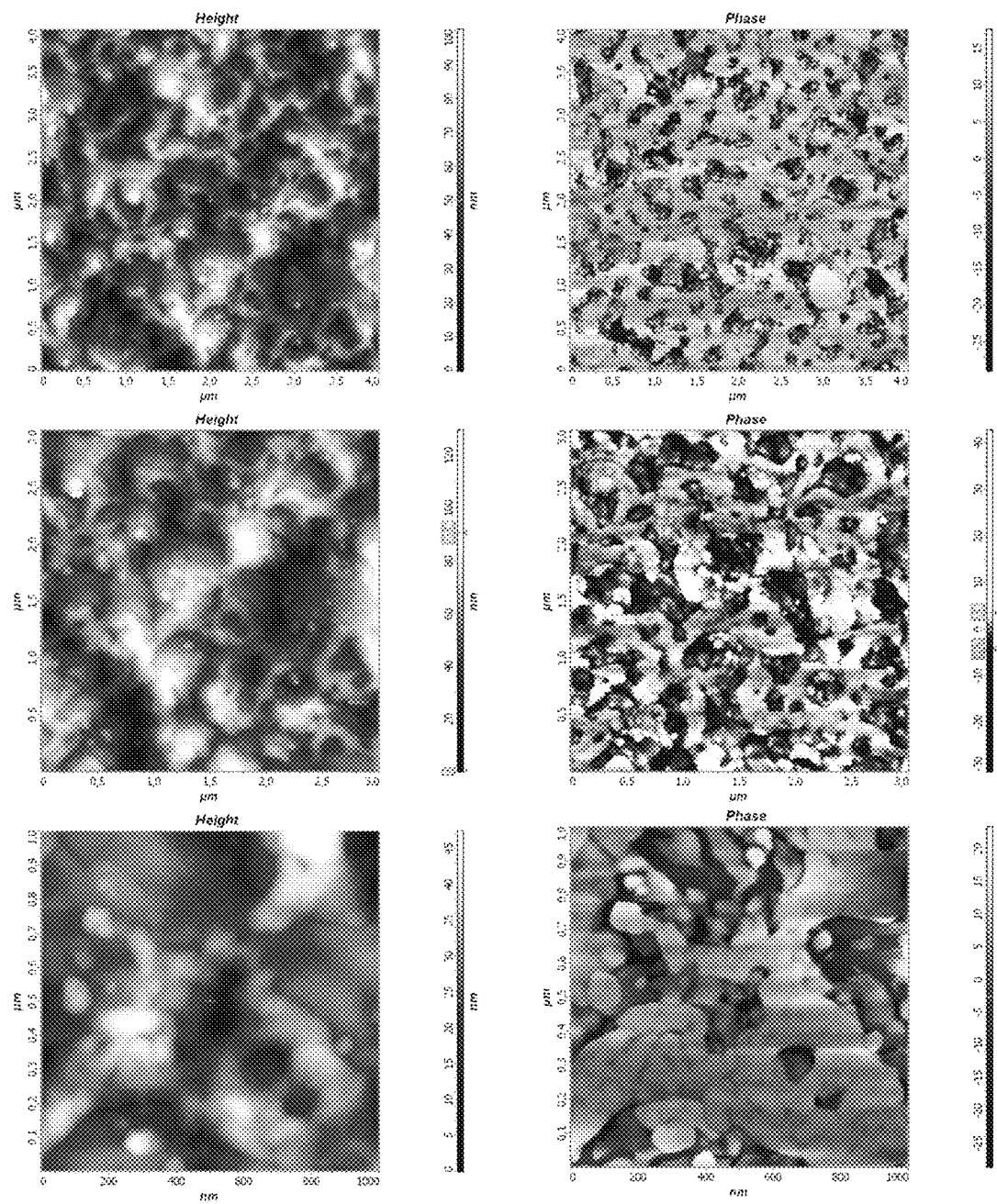
FIG. 27 shows phase images obtained through AFM-Atomic Force —of a mechanical mixture of crystalline 1,2 syndiotactic polybutadiene and amorphous 3,4 atactic polyisoprene obtained in Example 19.

FIG. 27 shows the phase images obtained through AFM—Atomic Force Microscopy—of the mechanical mixture of crystalline 1,2 syndiotactic polybutadiene and amorphous 3,4 atactic polyisoprene obtained.

Example 20

Extraction in Diethylether of Butadiene-Isoprene Diblock Copolymer Formed by Crystalline Polybutadiene (Hard Block)-Amorphous Polyisoprene (Soft Block)

2 grams of butadiene isoprene diblock copolymer formed by crystalline polybutadiene (hard block)-amorphous polyisoprene (soft block) obtained as described in Example 10, were continuously extracted for about 3 hours, with boiling diethylether (100 ml). At the end of the extraction the ether solution containing one part of the butadiene-isoprene diblock copolymer (soluble fraction in diethylether) was reduced in volume (to about 20 ml), then excess methanol was added (about 100 ml) so as to obtain the coagulation and precipitation of the dissolved copolymer: the whole was filtered and the residue on the filter was vacuum dried, at room temperature for one night, obtaining 0.770 g (yield 38.5% relative to the copolymer loaded) of copolymer.

The residue not extracted was in turn recovered, and then vacuum dried, at room temperature for one night, obtaining 1.230 g (yield 61.5% relative to the copolymer loaded) of copolymer.

The two fractions were examined through infra-red spectroscopy (FT-IR), highlighting a very similar structure, confirming the fact that the polymer material obtained is effectively a copolymer, and not a mixture of homopolymers.

TABLE 1

Copolymerization of 1,3-butadiene and isoprene with catalytic systems comprising iron complexes

| Example | Conversion (%) | (Co)polymer composition B[1] | (Co)polymer composition I[2] | PB[3] block microstructure cis-1,4 (%) | PB[3] block microstructure 1,2 (%) | PB[3] block microstructure [rr][8] (%) | PI[4] block microstructure cis-14 (%) | PI[4] block microstructure 3,4 (%) | $T_m^{(5)}$ (°C.) | $T_c^{(6)}$ (°C.) | $T_g^{(7)}$ (°C.) | $M_w$ (g/mol) | $M_w/M_n$ |
|---|---|---|---|---|---|---|---|---|---|---|---|---|---|
| 5 | 100 | 100 | — | 35.4 | 64.6 | 71.5 | — | — | 73.9 | 49.9 | — | 423700 | 2.1 |
| 6 | 100 | 100 | — | 31.7 | 68.3 | 73.0 | — | — | 93.0 | 72.1 | — | 556100 | 2.5 |
| 7 | 100 | 100 | — | 22.6 | 77.4 | 77.8 | — | — | 100 | 89.8 | — | 629100 | 2.1 |

TABLE 1-continued

Copolymerization of 1,3-butadiene and isoprene with catalytic systems comprising iron complexes

| | Conversion | (Co)polymer composition | | PB[3] block microstructure | | | PI[4] block microstructure | | $T_m$[5] | $T_c$[6] | $T_g$[7] | $M_w$ | |
|---|---|---|---|---|---|---|---|---|---|---|---|---|---|
| Example | (%) | B[1] (%) | I[2] (%) | cis-1,4 (%) | 1,2 (%) | [rr][8] (%) | cis-14 (%) | 3,4 (%) | (° C.) | (° C.) | (° C.) | (g/mol) | $M_w/M_n$ |
| 8 | 100 | 100 | — | 16.8 | 83.2 | 82.0 | — | — | 115 | 101.9 | — | 856300 | 2.6 |
| 9 | 100 | — | 100 | — | — | — | 33.0 | 67.0 | — | — | −49.8 | 211910 | 1.6 |
| 10 | 100 | 56.5 | 43.5 | 35.0 | 65.0 | 65.9 | 30.8 | 69.2 | 70.9 | 57.2 | −42.5 | 681400 | 2.4 |
| 11 | 100 | 79.6 | 20.4 | 34.7 | 65.3 | 66.7 | 30.5 | 69.5 | 76.6 | 70.7 | −55.3 | 693000 | 2.0 |
| 12 | 100 | 30.2 | 69.8 | 33.4 | 66.6 | 67.0 | 27.0 | 73.0 | 72.4 | 60.1 | −51.6 | 654000 | 2.1 |
| 13 | 100 | 56.5 | 43.5 | 33.1 | 66.9 | 69.8 | 32.0 | 68.0 | 86.3 | 68.2 | −48.2 | 829100 | 2.3 |
| 14 | 100 | 30.2 | 69.8 | 32.0 | 68.0 | 70.1 | 31.3 | 68.7 | 85.9 | 69.7 | −41.5 | 801500 | 2.6 |
| 15 | 100 | 30.2 | 69.8 | 28.2 | 71.8 | 75.9 | 30.9 | 69.1 | 118.7 | 105.1 | 45.7 | 857600 | 2.1 |
| 16 | 100 | 79.6 | 20.4 | 27.1 | 72.9 | 76.2 | 31.1 | 68.9 | 118.7 | 107.2 | −44.5 | 894500 | 2.2 |
| 17 | 100 | 56.5 | 43.5 | 21.0 | 79.0 | 79.7 | 30.1 | 69.9 | 121.8 | 111.3 | −46.1 | 1216800 | 2.4 |
| 18 | 100 | 30.2 | 69.8 | 22.4 | 77.6 | 80.3 | 28.8 | 71.2 | 120.2 | 109.7 | −45.0 | 954760 | 2.3 |

[1]B = 1,3-butadiene;
[2]I = isoprene;
[3]PB = polybutadiene;
[4]PI = polyisoprene;
[5]$T_m$ = melting point;
[6]$T_c$ = crystallization temperature;
[7]$T_g$ = glass transition temperature;
[8][rr] = content of syndiotactic triads in the block of polybutadiene with a 1,2 syndiotactic structure determined through 13C-NMR analysis;

In Table 1:
the melting point ($T_m$) in Examples 5-8 refers to homopolymer polybutadiene;
the melting point ($T_m$) in Examples 10-18 refers to the block of crystalline polybutadiene (hard block);
the crystallization temperature ($T_c$) in Examples 5-8 refers to homopolymer polybutadiene;
the crystallization temperature ($T_c$) in Examples 10-18 refers to the block of crystalline polybutadiene (hard block);
the glass transition temperature ($T_g$) in Examples 9 refers to homopolymer polyisoprene;
the glass transition temperature ($T_g$) in Examples 10-18 refers to the block of amorphous polyisoprene (soft block).

The invention claimed is:

1. Butadiene-isoprene diblock copolymer formed by a block of crystalline polybutadiene having a syndiotactic 1,2 unit content ≥60% and by a block of amorphous polyisoprene having a 3,4 atactic unit content ≥60%.

2. Butadiene-isoprene diblock copolymer according to claim 1, which is formed by: said block of crystalline polybutadiene having said syndiotactic 1,2 unit content ranging from 64% to 80%, and by said block of amorphous polyisoprene having said 3,4 atactic unit content ranging from 65% to 75%.

3. Butadiene-isoprene diblock copolymer according to claim 1, wherein in said butadiene-isoprene diblock copolymer:
upon infra-red analysis referred to as FT-IR typical bands of cis-1,4 and 1,2 syndiotactic butadiene units centered at 737 cm$^{-1}$ and 911 cm$^{-1}$, respectively, and of isoprene cis-1,4 and 3,4 atactic units centered at 840 cm$^{-1}$ and 890 cm$^{-1}$, respectively.

4. Butadiene-isoprene diblock copolymer according to claim 1, wherein in said butadiene-isoprene diblock copolymer:
said block of crystalline polybutadiene has a melting point referred to as $T_m$ that is greater than or equal to 65° C., and a crystallization temperature referred to as $T_c$ that is greater than or equal to 50° C.;
said block of amorphous polyisoprene has a glass transition temperature referred to as $T_g$ that is lower than or equal to −35° C.

5. Butadiene-isoprene diblock copolymer formed by a block of crystalline polybutadiene and by a block of amorphous polyisoprene, wherein said butadiene-isoprene diblock copolymer has a polydispersion index, referred to as PDI, corresponding to the $M_w/M_n$ ratio, in which $M_w$=weight average molecular weight, $M_n$=number average molecular weight, ranging from 2.0 to 2.6.

6. Butadiene-isoprene diblock copolymer according to claim 1, wherein said butadiene-isoprene diblock copolymer has a weight average molecular weight referred to as $M_w$ ranging from 600000 g/mol to 1300000 g/mol.

7. Process for the preparation of a butadiene-isoprene diblock copolymer according to claim 1 comprising the following steps:
(i) subjecting 1,3-butadiene to living polymerization in the presence of a catalytic system comprising at least one iron complex having general formula (I) or (II):

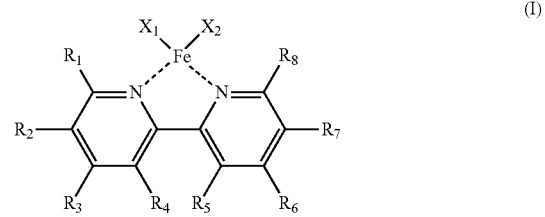

(I)

-continued

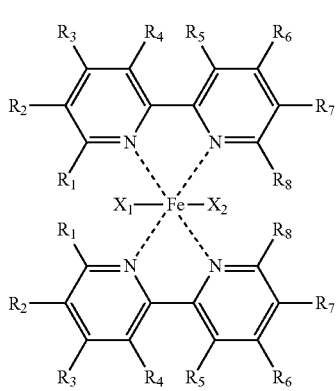

(II)

wherein:
R₁, R₂, R₃, R₄, R₅, R₆, R₇ and R₈, identical or different, represent a hydrogen atom;
or they are selected from a linear or branched, optionally halogenated, $C_1$-$C_{20}$ alkyl group, or an optionally substituted cycloalkyl group;
or R₄ and R₅, may be optionally linked together to form, together with the other atoms to which they are linked, a saturated, unsaturated or aromatic cycle containing 4 to 6 carbon atoms, optionally substituted with a linear or branched, $C_1$-$C_{20}$ alkyl group; said cycle optionally containing a heteroatom;
or R₁ and R₂ or R₃ and R₂, and/or R₃ and R₄, and/or R₅ and R₆, and/or R₆ and R₇ and/or R₇ and R₈, may be optionally linked together to form together with other atoms to which they are linked, a saturated, unsaturated or aromatic cycle containing 4 to 6 carbon atoms, optionally substituted with a linear or branched, $C_1$-$C_{20}$ alkyl group; said cycle optionally containing a heteroatom;
X₁ and X₂, identical or different, represent a halogen atom; or are selected from a linear or branched $C_1$-$C_{20}$ alkyl group, an —OCOR₉ group or an —OR₉ group wherein R₉ is selected from a linear or branched $C_1$-$C_{20}$ alkyl group;
and continuing said living polymerization until substantially complete conversion of 1,3-butadiene;
(ii) adding isoprene to the polymerization mixture obtained in step (i) and continuing said living polymerization until substantially complete isoprene conversion.

8. Process for the preparation of a butadiene-isoprene diblock copolymer according to claim 7, wherein in said iron complex having general formula (I) or (II):
R₁, R₂, R₃, R₄, R₅, R₆, R₇ and R₈, identical, represent a hydrogen atom; or
R₁, R₂, R₃, R₆, R₇ and R₈, identical, represent a hydrogen atom and R₄ and R₅ are linked to form together with the other atoms to which they are linked a saturated, unsaturated, or aromatic cycle containing 4 to 6 carbon atoms;
X₁ and X₂, identical or different, represent a halogen atom.

9. Process for the preparation of a butadiene-isoprene diblock copolymer according to claim 7, wherein said catalytic system comprises (b) at least one co-catalyst selected from:
(b₁) an aluminum alkyl having general formula (III):

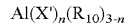  (III)

wherein X' represents a halogen atom; R₁₀, identical or different, represents a hydrogen atom, or is selected from a linear or branched $C_1$-$C_{20}$ alkyl group, a cycloalkyl group, or an aryl group; said groups being optionally substituted with at least one silicon or germanium atom; and n is an integer ranging from 0 to 2; or
(b₂) an aluminoxane having general formula (IV):

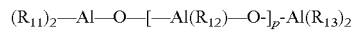  (IV)

wherein R₁₁, R₁₂ and R₁₃, identical or different, represent a hydrogen atom, a halogen atom, or are selected from linear or branched $C_1$-$C_{20}$ alkyl groups, cycloalkyl groups, or aryl groups, said groups being optionally substituted with one or more silicon or germanium atoms; and p is an integer ranging from 0 to 1000.

10. Process for the preparation of a butadiene-isoprene diblock copolymer according to claim 7, wherein:
said process is performed in the presence of an inert organic solvent comprising at least one solvent selected from: a saturated aliphatic hydrocarbon including at least one of butane, pentane, hexane, heptane, or mixtures thereof; a saturated cycloaliphatic hydrocarbon including at least one of cyclopentane, cyclohexane, or mixtures thereof; a mono-olefin including at least one of 1-butene, 2-butene, or mixtures thereof; an aromatic hydrocarbon including at least one of benzene, toluene, xylene, or mixtures thereof; or a halogenated hydrocarbon including at least one of methylene chloride, chloroform, carbon tetrachloride, trichlorethylene, perchlorethylene, 1,2-dichloroethane, chlorobenzene, bromobenzene, chlorotoluene, or mixtures thereof; and/or
in step (i) of said process, the concentration of said 1,3-butadiene in said inert organic solvent ranges from 5% by weight to 50% by weight, relative to the total weight of said 1,3-butadiene and said inert organic solvent; and/or
in step (ii) of said process, the isoprene concentration ranges from 5% by weight to 50% by weight, relative to the total weight of the polymerization mixture obtained in said step (i); and/or
said process is performed at a temperature ranging from −70° C. to +100° C.

* * * * *